(12) United States Patent
Iglauer-Angrik et al.

(10) Patent No.: US 11,319,158 B2
(45) Date of Patent: May 3, 2022

(54) CONVEYING SYSTEM, TREATMENT SYSTEM, AND CONVEYING METHOD

(71) Applicant: Dürr Systems AG, Bietigheim-Bissingen (DE)

(72) Inventors: Oliver Iglauer-Angrik, Stuttgart (DE); Kevin Woll, Heilbronn (DE); Dietmar Wieland, Waiblingen (DE); Jasmin Bajsini, Vaihingen (DE); Friedhelm Eisenacher, Bad Hersfeld (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 17/254,205

(22) PCT Filed: Jun. 26, 2019

(86) PCT No.: PCT/DE2019/100594
§ 371 (c)(1),
(2) Date: Dec. 18, 2020

(87) PCT Pub. No.: WO2020/001707
PCT Pub. Date: Jan. 2, 2020

(65) Prior Publication Data
US 2021/0229925 A1    Jul. 29, 2021

(30) Foreign Application Priority Data
Jun. 26, 2018   (DE) .......................... 102018210435.2

(51) Int. Cl.
*B65G 35/06*   (2006.01)
*B65G 47/52*   (2006.01)
*B62D 65/18*   (2006.01)

(52) U.S. Cl.
CPC ............. *B65G 35/06* (2013.01); *B62D 65/18* (2013.01); *B65G 47/52* (2013.01); *B65G 2201/0294* (2013.01)

(58) Field of Classification Search
None
See application file for complete search history.

(56) References Cited

U.S. PATENT DOCUMENTS

| 5,004,094 A | 4/1991 | Brandt |
| 5,322,156 A | 6/1994 | Kakita et al. |

(Continued)

FOREIGN PATENT DOCUMENTS

| CA | 2167621 | 7/1996 |
| DE | 1154252 | 9/1963 |

(Continued)

OTHER PUBLICATIONS

Internaional Searching Authority, International Search Report and Written Opinion, issued in connection with International Patent Application No. PCT/DE2019/100593, dated Aug. 21, 2019, 21 pages. Rough English machine translation included.

(Continued)

*Primary Examiner* — Kavel Singh
(74) *Attorney, Agent, or Firm* — Hanley, Flight & Zimmerman, LLC

(57) ABSTRACT

In order to create a conveying system which is of simple construction and enables an efficient conveyance of objects, it is proposed that the conveying system comprises a first conveying device and a second conveying device, wherein the objects are able to be taken over from the first conveying device and/or are transferrable to the first conveying device by means of the second conveying device.

30 Claims, 14 Drawing Sheets

(56) References Cited

U.S. PATENT DOCUMENTS

| | | | |
|---|---|---|---|
| 5,577,593 A | 11/1996 | Hooper | |
| 9,284,127 B2* | 3/2016 | Heinsohn | B65G 47/80 |
| 9,316,406 B2 | 4/2016 | Wieland et al. | |
| 9,423,179 B2* | 8/2016 | Wieland | F26B 15/14 |
| 10,259,663 B2 | 4/2019 | Heuft | |
| 2006/0283687 A1 | 12/2006 | Heinemeier et al. | |
| 2009/0013524 A1 | 1/2009 | Kodo et al. | |
| 2011/0111357 A1 | 5/2011 | Klobucar et al. | |
| 2013/0232801 A1 | 9/2013 | Wieland et al. | |
| 2015/0121720 A1 | 5/2015 | Wieland et al. | |
| 2018/0155134 A1 | 6/2018 | Heuft | |

FOREIGN PATENT DOCUMENTS

| | | |
|---|---|---|
| DE | 3612021 | 10/1987 |
| DE | 4222349 | 1/1994 |
| DE | 19522264 | 9/1996 |
| DE | 19634693 | 3/1998 |
| DE | 9422327 | 3/2000 |
| DE | 10208974 | 9/2003 |
| DE | 20313944 | 12/2004 |
| DE | 202007009590 | 8/2007 |
| DE | 102010043087 | 5/2012 |
| DE | 102012207312 | 11/2013 |
| EP | 0678463 | 10/1995 |
| GB | 579187 | 7/1946 |
| JP | S5888070 | 5/1983 |
| WO | 2016174270 | 11/2016 |
| WO | 2020001706 | 1/2020 |

OTHER PUBLICATIONS

German Patent and Trademark Office, "Search Report," issued in connection with German Patent Application No. 10 2018 210 433.6, dated Jun. 26, 2018, 13 pages. English translation included.

German Patent and Trademark Office, "Search Report," issued in connection with German Patent Application No. 10 2018 210 435.2, dated Jun. 26, 2018, 15 pages. English translation included.

International Searching Authority, International Search Report and Written Opinion, issued in connection with International Patent Application No. PCT/DE2019/100594, dated Sep. 9, 2019, 22 pages. Rough machine English translation included.

* cited by examiner

CONVEYING SYSTEM, TREATMENT SYSTEM, AND CONVEYING METHOD

RELATED APPLICATION

This application is a national phase of international application No. PCT/DE2019/100594 filed on Jun. 26, 2019, and claims the benefit of German application No. 10 2018 210 435.2 filed on Jun. 26, 2018, which are incorporated herein by reference in their entirety and for all purposes.

FIELD OF DISCLOSURE

The present invention relates, among other things, to the field of treatment plants, in particular painting and drying plants for the automotive industry.

BACKGROUND

An aspect of the invention relates to the minimization of a fluid exchange between adjacent spaces. For example, DE 10 2010 043 087 A1 discloses in this regard an air curtain or an airlock for minimizing an air exchange between adjacent spaces.

SUMMARY OF THE INVENTION

The object underlying the present invention is to create a device for minimizing a fluid exchange between adjacent spaces, which is of simple construction and enables an efficient fluidic separation of two adjacent spaces.

This object is achieved in accordance with the invention by a separating device for minimizing a fluid exchange between adjacent spaces, wherein the separating device preferably comprises the following:
a nozzle device, by means of which a separating fluid stream is introducible into a transition region between the adjacent spaces; and
a movable cover element, by means of which a connecting opening connecting the two adjacent spaces to each other is coverable or closeable at least in sections.

Because the separating device preferably comprises a moveable cover element for covering or closing the connecting opening at least in sections, a fluidic separation between the adjacent spaces can preferably be optimized. In particular, in cooperation with the nozzle device, a separating fluid stream can bring about a more efficient fluidic separation between the two adjacent spaces.

By covering or closing the connecting opening at least in sections by means of the moveable cover element, in particular a free cross sectional area of the connecting opening is reduced.

An air curtain is preferably producible by means of the nozzle device.

The nozzle device preferably comprises a slit nozzle, which produces such an air curtain.

The separating fluid in particular is air. For example, fresh air, conditioned air, and/or exhaust air from a treatment space of a treatment plant may be provided for this purpose.

The cover element in particular is a moveable shield.

The cover element preferably forms a mechanical and/or physical barrier for the air arranged in the adjacent spaces.

By using the moveable cover element, in particular, a reduced susceptibility of the separating device to fail in comparison to conventional gate solutions can be achieved. In addition, undesired cross flow between the adjacent spaces or within the respective spaces can preferably be reduced or completely avoided.

It may be advantageous if the cover element comprises a fluid guiding portion for conducting the separating fluid stream.

In a closing position of the cover element, the fluid guiding portion forms, in particular, a nozzle extension for conducting the separating fluid stream from the nozzle device.

The cover element preferably comprises an inlet opening, in particular an inlet slit, which in particular is arranged in parallel to an outflow opening of the nozzle device.

The cover element and/or the nozzle device preferably extend at least approximately over an entire width of the transition region and/or the connecting opening.

In particular, the cover element projects into the connecting opening from above in relation to the direction of gravity.

The cover element may comprise e.g. two parallel cover plates, for example planar metal sheets, which are fixed at a distance from each other, for example by means of connecting webs and/or spacers. In particular, a fluid guiding portion is formed between the two cover plates for conducting the separating fluid stream.

The fluid guiding portion is in particular a cavity between two cover plates of the cover element. The two ends of the fluid guiding portion are configured in particular in the form of slits, such that the inlet opening is configured in particular as an inlet slit, while the outlet opening is configured in particular as an outlet slit.

The two cover plates may have e.g. at least approximately identical dimensions in one, two or all three spatial directions. Alternatively thereto, provision may be made for a first of the two cover plates to be of shorter configuration compared to a second of the two cover plates, for example by at least about 10%, preferably by at least about 25%, in particular by at least about 40%, of a maximum and/or average extent of the second cover plate along a main flow direction of the separating fluid stream within the cover element, in particular within the fluid guiding portion. Both cover plates preferably end together at an end of the cover element facing the nozzle device and extend to correspondingly different extents starting therefrom in the direction of the end of the cover element remote from the nozzle device.

If the shorter of the two cover plates is arranged on an outer side of the cover element remote from a treatment space, this preferably results in an admixing of air, in particular cold air, from outside of the treatment space. A flow cylinder producible by means of the separating device is then in particular a cold air cylinder.

Alternatively thereto, provision may also be made for the shorter of the two cover plates to be arranged on an inner side of the cover element facing a treatment space. This then preferably results in an admixing of air, in particular warm air, from within the treatment space. A flow cylinder producible by means of the separating device is then in particular a warm air cylinder.

In dependence on a position of the cover element, the separating fluid supplied by way of the nozzle device can selectively flow into the free space in the transition region already at the outflow opening of the nozzle device or only at an outlet opening of the cover element.

It may be advantageous if the cover element is selectively moveable into a closing position for covering or closing the connecting opening at least in sections or into an open position for at least approximately completely unblocking the connecting opening.

The separating device preferably comprises a drive device for driving the cover element. In particular, the drive device comprises an electric motor.

It may be favorable if the separating device comprises a positioning device, by means of which the cover element is automatically moveable into the open position in the case of failure of the drive device. The positioning device is preferably a device different from the drive device.

For example, provision may be made for the positioning device to comprise one or more weights, which form a counterweight to the, in particular, rotatably mounted cover element and move the cover element into the open position in the case of failure of the drive device. In particular, in the case of failure of the drive device, the cover element can be moved by means of the positioning device out of a movement path of objects moved through the separating device, for example pulled upwards counter to the direction of gravity.

Provision may be made for the cover element in the closing position to face with an inlet opening of a fluid guiding portion of the cover element toward an outflow opening of the nozzle device.

In particular, the cover element in the closing position faces with an inlet opening of a fluid guiding portion of the cover element toward an outflow opening of the nozzle device in such a way that the separating fluid stream flowing out of the outflow opening is directed into the fluid guiding portion of the cover element by the inlet opening.

It may hereby be provided, in particular, that in the closing position of the cover element, the outflow opening of the nozzle device opens into the inlet opening of the fluid guiding portion and/or projects into the same, in particular contactlessly.

It may be advantageous if in the closing position of the cover element, the outflow opening of the nozzle device is at a distance from the inlet opening of the fluid guiding portion.

In an open position of the cover element, the inlet opening is preferably at a greater distance from the outflow opening of the nozzle device than in the closing position of the cover element. Alternatively or in addition thereto, provision may be made for the inlet opening in the open position of the cover element to be arranged laterally offset from the nozzle device in relation to a main flow direction of the separating fluid stream.

It may be favorable if in the closing position of the cover element the outflow opening of the nozzle device together with the inlet opening of the fluid guiding portion form a suction jet nozzle.

In particular, inclined surfaces, taperings, and/or widenings of ends of the outflow opening and/or the inlet opening may hereby be provided in order to optimize a flow of the separating fluid.

In particular, provision may be made for the inlet opening of the fluid guiding portion to comprise a funnel-shaped portion, into which the outflow opening of the nozzle device opens.

It may be advantageous if in the closing position of the cover element, formed between the nozzle device and the cover element are one or more additional slits through which fluid is guidable, in particular suctionable, from one of the adjacent spaces or from both adjacent spaces into the fluid guiding portion.

The additional slits are, in particular, arranged opposite each other and each face toward one of the adjacent spaces to be separated from each other.

By means of one or more additional slits, in particular an annular flow, for example a flow cylinder, can be formed in a simpler and thus more energy-efficient manner.

A separating fluid stream guided through the nozzle device and/or the cover element flows e.g. into a base region of the transition region and there is deflected and/or split, for example using one or more flow directing elements, for example a silhouette sheet, to ultimately achieve a fluidic separation between the adjacent spaces. In particular, the formation of a flow cylinder is facilitated by means of one or more flow directing elements.

It may advantageous if the separating device comprises one or more suction openings, by means of which a separating fluid stream and/or another fluid stream is suctionable, in particular from a transition region between the two spaces and/or from one of the spaces and/or from both spaces.

The term "suctioning" is hereby preferably understood to mean an active or passive discharge of a portion of or the entire fluid stream in the transition region between the two spaces and/or from one of the spaces and/or from both spaces.

The one or more suction openings are, in particular, a constituent part of an air recirculation system of a treatment installation, in particular an air recirculation system in a treatment space of the treatment installation that adjoins the separating device.

Alternatively or in addition hereto, provision may be made for the one or more suction openings to form, for example together with the nozzle device of the separating device, an air recirculation system, in particular independent of an air circulation system or another fluid guidance system in the adjoining spaces.

It may be favorable if an amount of a volume flow of a fluid stream dischargeable by means of the one or more suction openings is at least about 50%, preferably at least about 100%, preferably at least about 200%, of an amount of a volume flow of a fluid stream suppliable by means of the nozzle device.

Alternatively or in addition thereto, provision may be made for an amount of a volume flow of a fluid stream dischargeable by means of the one or more suction openings to be at most about 200%, preferably at most about 100%, preferably at most about 50%, of an amount of a volume flow of a fluid stream suppliable by means of the nozzle device.

It may be advantageous if one or more suction openings are each associated with a fan or each with a plurality of fans for driving the fluid stream to be suctioned.

One or more suction openings are arranged, in particular, in a base region of the separating device, in particular integrated into a base of the separating device.

It may be favorable if one or more suction openings are arranged and/or formed at points.

In particular, two or more than two suction openings may be arranged on both sides of a conveying device.

Alternatively or in addition hereto, provision may be made for one or more suction openings to be arranged and/or formed linearly. In particular, one or more suction openings may be configured as a suction slit. A main direction of extent of one or more suction slits is, in particular, substantially horizontal and/or transverse, in particular substantially perpendicular, to a conveying direction.

One or more suction openings are positioned and/or formed in particular in such a way that a separating fluid stream exiting the nozzle device and/or a separating fluid stream exiting the cover element in the closing position of the cover element is directed at the one or more suction openings.

In particular, the one or more suction openings in the closing position of the cover element are arranged at an outlet opening of the cover element in direct extension of the cover element along a flow direction of the separating fluid stream.

The cover element is preferably arranged on a rotatable shaft or comprises a rotatable shaft.

By means of the rotatable shaft or together with the rotatable shaft, the cover element is preferably rotatable or pivotable about a rotational axis. In particular, the rotational axis of the cover element is a longitudinal middle axis of the shaft.

It may be favorable if the rotational axis of the cover element is aligned in parallel to the outflow opening of the nozzle device and/or perpendicular to a conveying direction of a conveying system, which is yet to be described.

In particular, the rotational axis is preferably parallel to a separating plane and/or perpendicular to one or more side walls of the adjacent spaces.

The inlet opening, in particular the inlet slit, of the cover element is preferably arranged and/or formed in an end region of the cover element facing toward the rotational axis. As a result, the inlet opening of the cover element can preferably be precisely positioned, in particular relative to the outflow opening of the nozzle device.

A shaft diameter of the rotatable shaft is preferably at least about 50 mm, for example at least about 70 mm, and/or at most about 250 mm, for example at most about 150 mm.

The rotatable shaft and/or the cover element are preferably mounted on side walls of the separating device and/or of the adjacent spaces. In particular, the occurrence of abrasion can hereby be avoided over a conveying region extending through the separating device.

In particular metal, for example steel or aluminum, may be provided as the material for the shaft. In particular, the shaft is made of steel.

In particular metal, for example steel or aluminum, may be provided as the material for the cover element. In particular, the cover element is made of aluminum.

It may be favorable if the cover element is arranged, in particular mounted, on the rotatable shaft by means of a compensation device.

The compensation device comprises e.g. one or more length compensation elements for compensating for thermal expansion changes to the shaft and/or the cover element.

In one embodiment, provision may be made for the shaft and the cover element to be connected to each other by means of a screw connection, wherein one or more screw holes are then preferably configured as elongate holes in order to be able to compensate for a thermal expansion change.

It may be favorable if the shaft and the cover element are at least approximately centrally immovably connected to each other, for example screwed and/or welded, in relation to a transverse direction extending horizontally and perpendicularly to a conveying direction and/or in relation to a main direction of extent of the shaft and/or in relation to a rotational axis of the cover element and/or the shaft, such that a thermal expansion change leads e.g. to a displacement at the ends of the shaft and/or the cover element. In particular in the case of thermal expansion changes to differing degrees, at these ends of the shaft and/or the cover element, a connection thereof by means of one or more length compensation elements, for example screw connections with elongate holes, may be provided.

The cover element is preferably arranged on an upper side of the connecting opening in relation to the direction of gravity, for example on a cover wall of the separating device.

For covering or closing the connecting opening at least in sections, the cover element is preferably introducible, in particular pivotable, into the connecting opening from above.

Alternatively or in addition hereto, provision may be made for the cover element or a further cover element to be introducible, in particular pivotable, into the connecting opening from below.

A pivot direction of the cover element is preferably selected such that the cover element, upon moving the same from the open position into the closing position, is moved in the direction of that space in which a higher air quality and thus an air quality that is to be more strongly protected prevails.

It may be advantageous if a free cross section or opening cross section of the connecting opening is temporarily reducible by means of the cover element, in particular to at most about 70%, preferably to at most about 50%, for example to at most about 30%, of an opening cross section in the open position of the cover element.

It may be further advantageous if a cross section or opening cross section of the connecting opening that is free in the open position of the cover element is temporarily completely closable or almost completely closeable, in particular reducible to at most about 20%, preferably to at most about 10%, for example to at most about 5%, of an opening cross section in the open position of the cover element.

The cover element may, in particular, be formed as one piece or as multiple pieces. In particular, one single or a plurality of plate-shaped or plate-like cover element portions may be provided, which are moveable, in particular pivotable, relative to one or more walls and/or relative to each other. As a result, in particular a pivoting range of the cover element that is to be kept clear for actuating the cover element can be minimized.

The separating device described above is suitable, in particular, for use in a treatment plant.

An aspect of the invention thus also deals with a treatment plant for treating workpieces, for example a painting plant for painting workpieces. Such a painting plant in particular comprises a dryer, which should be particularly protected from undesired air currents for the purposes of an energy efficient operation.

The treatment plant preferably comprises a separating device in accordance with the invention, which in particular serves to minimize a fluid exchange between a treatment space of the treatment plant on the one hand and at least one further space on the other hand.

The separating device may, in particular, be provided at an inlet of the treatment space or at an outlet of the treatment space. Further, a plurality of separating devices may be provided, for example at the inlet, at the outlet, and/or within the treatment space.

The further space may be, for example, a cooling space, which adjoins a treatment space of the treatment plant that is configured as a drying space.

The treatment plant preferably further comprises a conveying system for conveying workpieces. The cover element in a closing position thereof preferably projects into a movement path of the workpieces.

The movement path is thereby in particular that spatial region which is passed over by the workpieces upon the conveyance of the workpieces by means of the conveying system.

By means of the conveying system, the workpieces are conveyable, in particular, from one space into the treatment space, through the treatment space, and out of the treatment space into a further space.

It may be advantageous if the treatment plant comprises a control device and/or a sensor device, by means of which a workpiece approaching the transition region between the two adjacent spaces or already arranged before or in the transition region is detectable. The cover element is then in particular bringable from a closing position into an open position by means of the control device and/or the sensor device. A movement path of the workpiece is thereby preferably unblockable in the region of the connecting opening.

In a further embodiment, provision may be made for the conveying system to comprise an accelerating device, by means of which a workpiece is conveyable through the connecting opening at an increased speed and/or at a reduced step cycle time compared to a conveying speed and/or step cycle time in the treatment space.

The cover element is then open only for a shorter period of time in comparison to the conveyance of the workpieces without such an accelerating device, whereby the fluid exchange between the adjacent spaces, in particular the air exchange between the adjacent spaces, can be further minimized.

A further aspect of the invention relates to a conveying system for conveying objects, in particular vehicle bodies.

Conveying systems in general are known, for example from EP 0 678 463 B1.

A conveying system preferably comprises the following: a first conveying device for conveying the objects at a first speed and/or at a first step cycle time; and a second conveying device, by means of which the objects are conveyable at a second speed and/or at a second step cycle time, wherein the second speed is preferably higher than the first speed and/or wherein the second step cycle time is preferably shorter than the first step cycle time.

The objects are preferably able to be taken over from the first conveying device and/or transferrable to the first conveying device by means of the second conveying device.

It may be favorable if the second conveying device comprises a lifting device, by means of which the objects are liftable from the first conveying device and thereby receivable by means of the second conveying device.

The second conveying device comprises, in particular, a lifting device, by means of which the objects are lowerable onto the first conveying device or onto a third conveying device and are thereby transferrable to the first conveying device or the third conveying device.

In the conveying system in accordance with the invention, provision is made, in particular, for the objects to be liftable from the first conveying device by means of the second conveying device, then to be accelerated or conveyable in a faster manner in comparison to the conveyance by means of the first conveying device, and finally to be placeable by means of the second conveying device onto the first conveying device or a third conveying device.

Provision may be made for conveying elements of the second conveying device to be raisable and thereby bringable into engagement with the objects, in particular in a positive-locking manner, by means of the lifting device.

Alternatively or in addition hereto, provision may be made for conveying elements of the second conveying device to be lowerable and thereby bringable out of engagement with the objects by means of the lifting device.

The conveying elements enable, in particular, a positive-locking accommodation of the objects with respect to a conveying direction, such that, in particular, an exact positioning of the objects in the reception and/or the hand-off thereof by means of the second conveying device is ensured along the conveying direction.

The conveying elements preferably engage on the workpieces directly or on workpiece receptacles for accommodating the workpieces, for example on skid runners of a skid.

It may be favorable if the conveying elements are carriages, which in particular are drivable by means of one or more chains.

It may be favorable if the second conveying device extends only along a portion of a conveying path of the first conveying device.

The first conveying device preferably extends on both sides beyond the ends of the second conveying device.

The first conveying device and the second conveying device preferably comprise mutually different conveying elements, which in particular engage on mutually different points of engagement on the workpieces and/or workpiece receptacles for accommodating the workpieces.

In particular, the first conveying device and the second conveying device are arranged overlapping each other.

For example, provision may be made for the second conveying device to be arranged within or outside of the first conveying device with respect to a horizontal transverse direction that is oriented perpendicular to the conveying direction.

In one embodiment of the conveying system, provision may be made for the first conveying device to be a step-wise conveyor, with which the objects are each conveyable within a predetermined step cycle time from a holding position to a subsequent further holding position along a conveying path.

Upon reaching a predetermined holding position within a step cycle of the first conveying device and/or during a dwell time of the objects at the respective holding position, the objects are preferably receivable from the predetermined holding position by means of the second conveying device and are bringable to another holding position.

Individual or a plurality of holding positions of the first conveying device are thus preferably skippable by means of the second conveying device.

The first conveying device is preferably a chain conveyor.

Alternatively or in addition hereto, provision may be made for the second conveying device to be a chain conveyor.

It may be favorable if the first conveying device is a chain conveyor with at least two separate chains. In particular, the chains are arranged one following the other along the conveying direction and thus cover different partial paths of a total conveying path.

It may be advantageous if the chains are synchronized with each other, such that, in particular, in step-wise conveyance a uniform step cycle and uniform dwell times at the individual holding positions are settable across the entire first conveying device.

The chains of the first conveying device arranged one behind the other along the conveying direction are, in particular, arranged in mutually different spaces of a treatment plant. In particular, a continuously recurring heating and cooling of the chain in different spaces can hereby be avoided, compared to using one single chain.

The chains of the first conveying device succeeding one other in the conveying direction adjoin at their mutually facing ends, in particular, a separating device and/or a second conveying device.

It may be favorable if the objects are conveyable up to the second conveying device by means of the first chain. The objects are then preferably conveyable by means of the second conveying device to the second chain of the first conveying device. The objects are then preferably conveyable away from the second conveying device by means of said second chain.

Depending on the configuration of the first conveying device, more than two chains succeeding one another in the conveying direction may be provided.

Alternatively or in addition thereto, a plurality of pairs of chains may be arranged succeeding one another along the conveying direction.

The conveying system is suitable, in particular, for use in a treatment plant for treating workpieces. The present invention therefore also relates to such a treatment plant.

The treatment plant preferably comprises a conveying system in accordance with the invention. By means of the first conveying device, workpieces are preferably conveyable through a treatment space of the treatment plant. The workpieces are preferably conveyable by means of the second conveying device through a transition region between the treatment space and a further space.

This may be, in particular, at an entrance of the treatment space and/or at an exit of the treatment space.

It may be advantageous if the transition region is a lock region for minimizing an air exchange between the treatment space and the further space. The transition region preferably extends so far along a conveying path of the conveying system that the transition region comprises at least one holding position of the first conveying device or at least would comprise at least one such holding position if a series of holding positions of the first conveying device were extended into the transition region.

The second conveying device preferably comprises a receiving station for receiving the workpieces and/or a hand-off station for handing off the workpieces.

The receiving station is arranged e.g. in the treatment space or in the transition region or in a further space.

The hand-off station is preferably arranged in the further space or in the treatment space.

The treatment space is, for example, a drying space in which the workpieces are heated, in particular for paint drying.

The further space is e.g. a cooling space adjoining the drying space.

It may be advantageous if the treatment plant comprises a cover element, which in particular is introducible into a movement path of the workpieces in the transition region for temporarily reducing a connecting opening between the treatment space and the further space.

By means of a control device of the treatment plant, the cover element and the second conveying device are preferably controllable in such a way that the cover element is moved out of the movement path when a workpiece is introduced into the transition region and/or conveyed through the transition region and/or moved out of the transition region by means of the second conveying device.

The present invention further relates to a method for conveying objects, in particular workpieces.

The method preferably comprises the following:
conveying the objects by means of a first conveying device at a first speed and/or at a first step cycle time;
conveying the objects by means of a second conveying device at a second speed and/or at a second step cycle time, wherein the second speed is preferably higher than the first speed and/or wherein the second step cycle time is preferably shorter than the first step cycle time.

The objects are preferably taken over from the first conveying device and/or transferred to the first conveying device by means of the second conveying device.

The method in accordance with the invention preferably has individual or a plurality of the features and/or advantages described in conjunction with the conveying system in accordance with the invention.

It may be favorable if one or more holding positions, in which the objects temporarily dwell or would dwell upon being conveyed by means of the first conveying device, are skipped by means of the second conveying device.

In particular, the objects are introduced into a transition region between adjacent spaces and/or are conveyed through the transition region and/or are moved out of the transition region by means of the second conveying device. Thereby and/or for this purpose, a moveable cover element of a separating device arranged in the transition region is opened. Thereby and/or for this purpose, a movement path of the objects is preferably also unblocked.

The transition region is, in particular, a lock region.

The transition region is preferably not a region in which the objects dwell between two conveying step cycles. Rather, the transition region is preferably a portion through which the objects, in particular the workpieces, are conveyed in an accelerated manner.

The objects, in particular the workpieces, for example the vehicle bodies, are conveyed, in particular, in a transverse manner of travel through the transition region and/or through the connecting opening.

In this transverse manner of travel, a longitudinal axis of the objects, in particular the workpieces, for example the vehicle bodies, is oriented transversely, preferably perpendicularly, to the conveying direction. In addition, the longitudinal axis is preferably oriented substantially horizontally.

For receiving and conveying the objects by means of the second conveying device, said second conveying device comprises, in particular, two or four conveying elements, for example carriages.

When using four carriages, they are dimensioned and arranged in particular such that they, for example, can engage on a workpiece receptacle, in particular on a skid, at four corner regions, in particular at both end regions of both skid runners of the skid.

When using two carriages, they are preferably dimensioned such that each carriage touches both respective skid runners, a carriage engaging, in particular, on a front region of the skid runners in relation to the longitudinal axis of the workpieces, in particular the vehicle bodies, and a further carriage engaging, in particular, on a rear region of the skid runners in relation to the longitudinal axis of the workpieces, in particular the vehicle bodies.

For correctly localizing and positioning the workpieces relative to conveying elements of the first conveying device and/or relative to conveying elements of the second conveying device, in particular one or more sensor elements are provided. In particular mechanical or inductive sensors, for example initiators, may be provided as sensor elements.

Alternatively or in addition hereto, solid stops and/or light barriers and/or other contacts may be provided at one or more end positions of the second conveying device in order to correctly position the objects, in particular the workpieces, for example on a receiving station and/or a hand-off station, in particular relative to conveying elements of the first conveying device.

For correctly positioning and/or monitoring the position of the objects, in particular the workpieces, an incremental encoder may further be provided.

Alternatively or in addition, one or more co-moving initiators on a conveying device, for example the first conveying device or the second conveying device may also be provided. In particular, by means of initiators of that kind, an object, in particular a workpiece or a workpiece receptacle, can be found, in particular located, in a predetermined positioning region. This then enables, in particular, a simple correction of the positioning of the objects relative to a conveying device and/or a correction of the positioning of the conveying device relative to the objects.

Alternatively or in addition, one or more position sensors, in particular height sensors, may also be provided for monitoring the reception, hand-off and/or transfer of workpieces. One or more position sensors thereby detect, in particular, a lifting and/or lowering of the respective workpiece from a conveying device, for example a chain conveyor, or onto a conveying device, for example a chain conveyor.

It may be favorable if the one or more position sensors are mechanically actuatable, in particular by placing a workpiece and/or a workpiece receptacle on the one or more position sensors.

The one or more position sensors are, in particular, arranged in a receiving region, in a hand-off region, and/or in a transfer region and are preferably actuated directly by the workpiece and/or directly by the workpiece receptacle when the workpiece and/or the workpiece receptacle is raised or lowered.

In particular, a plurality of position sensors are provided, which detect a raising and/or lowering of a workpiece and/or a workpiece receptacle at different points of the workpiece and/or the workpiece receptacle.

For example, two or more than two position sensors may be provided on both sides of a conveying device and/or along a conveying direction of the conveying device in order to detect an orientation of the workpiece and/or the workpiece receptacle that deviates from a predetermined target orientation, in particular from the horizontal orientation.

It may be favorable if one or more position sensors each have one or more actuating elements, for example actuating brackets. By means of such an actuating element, the respective position sensor can be actuated, in particular, across a large spatial region. For example, a simultaneous actuation by different points and/or constituent parts of the workpiece and/or the workpiece receptacle is possible by means of an actuating element.

For example, one or more actuating elements configured as actuating brackets may be provided, which, for example in a transverse conveyance of workpieces conveyed on skids, are each actuatable by both skid runners of the skid. Optionally, it can then simultaneously be determined whether both skid runners evenly actuate the actuating bracket, from which a correct alignment of the workpiece relative to the conveying device can be inferable.

A correct arrangement on the conveying device, for example on a chain conveyor, in particular on trolleys of a chain conveyor, can preferably be inferred from a position, height and/or orientation of the workpiece and/or the workpiece receptacle determined by means of one or more position sensors.

Further preferred features and/or advantages of the invention are the subject matter of the subsequent description and the illustrative depiction of an exemplary embodiment.

BRIEF DESCRIPTION OF THE DRAWINGS

Identical or functionally equivalent elements are provided with the same reference numerals in all Figures.

DETAILED DESCRIPTION OF THE DRAWINGS

Figure 1:
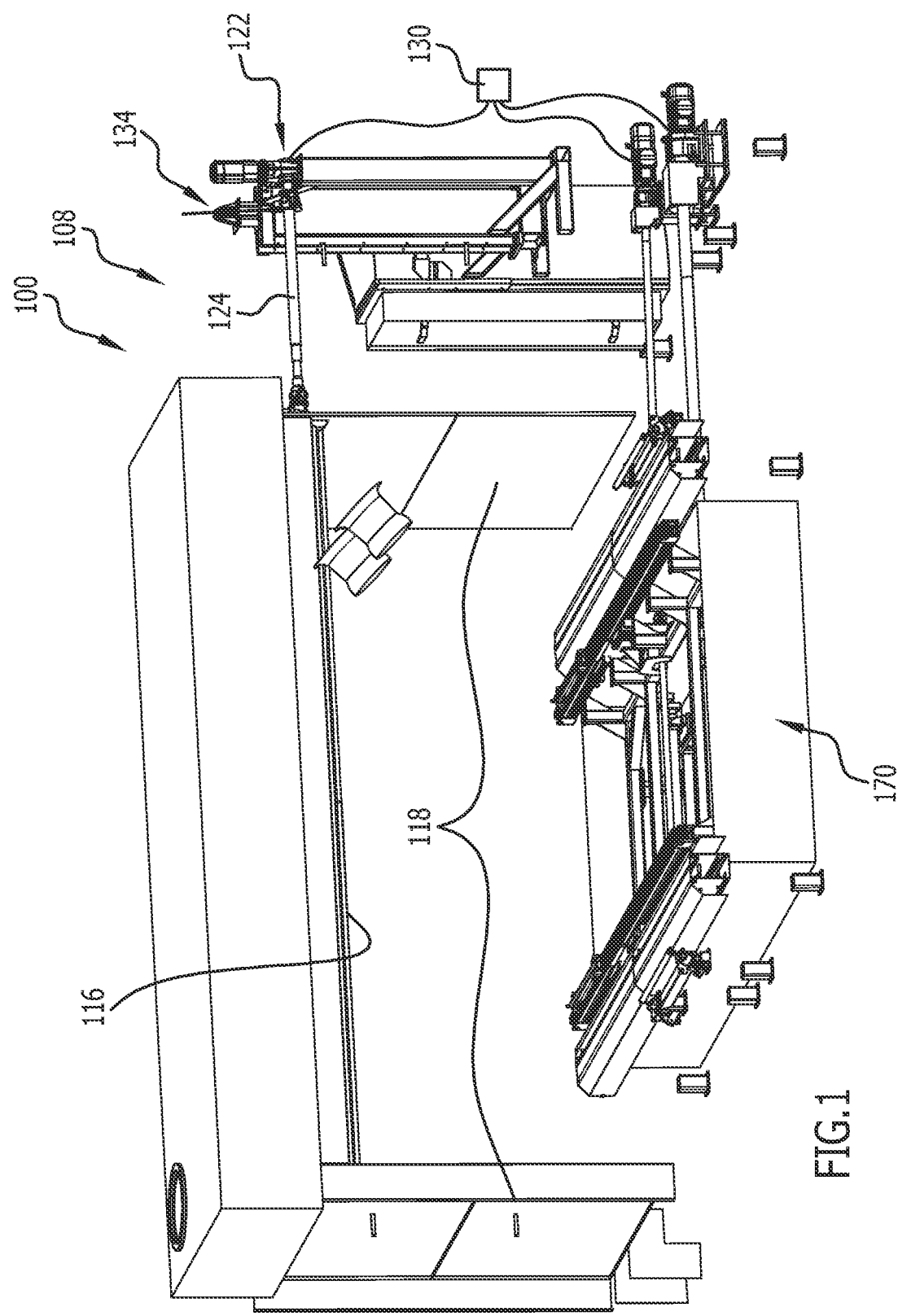
FIG. 1 shows a schematic perspective depiction of a separating device and a conveying system of a treatment plant, a cover element of a separating device being arranged in an open positon.
Figure 2:
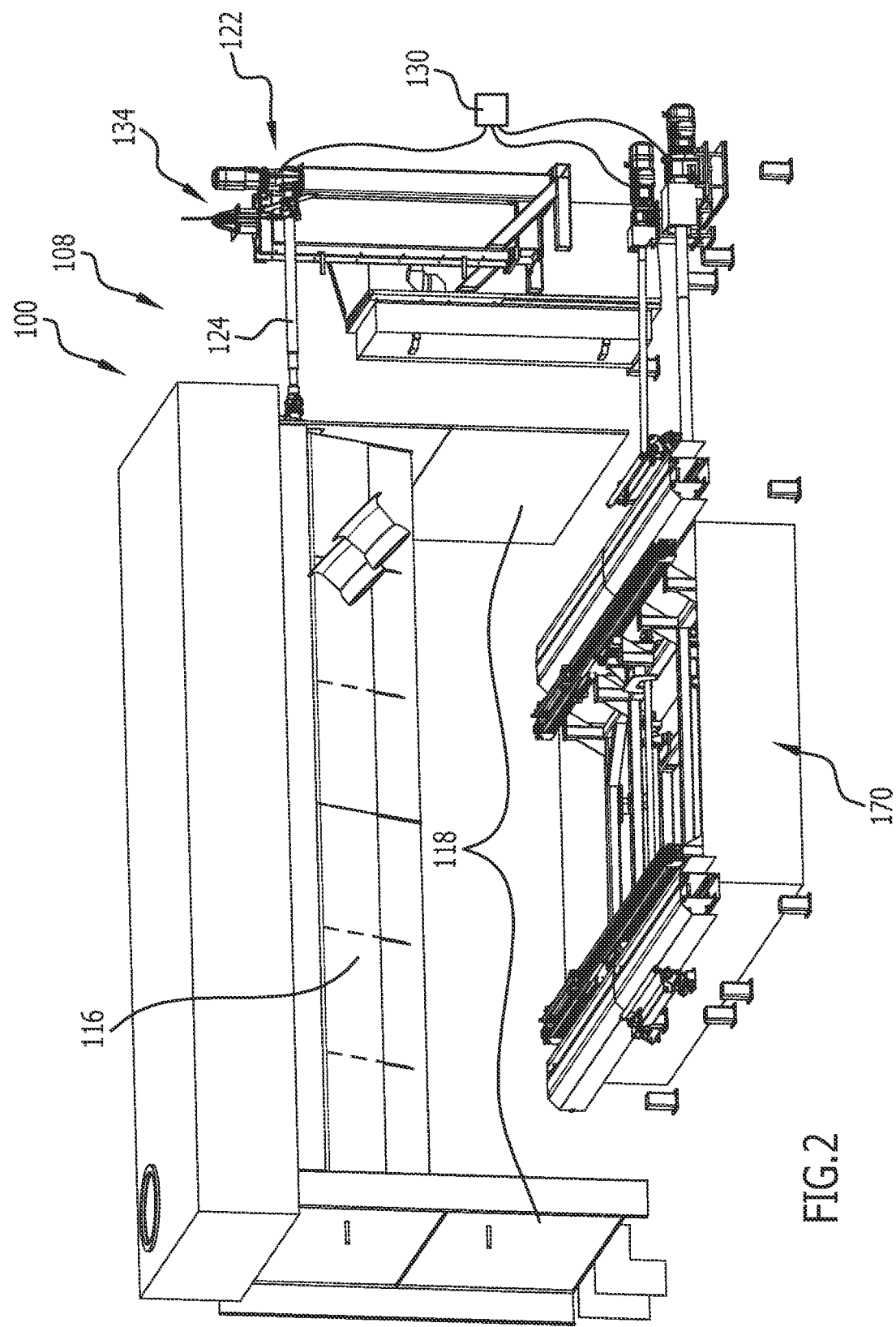
FIG. 2 shows a schematic depiction, corresponding to FIG. 1, of the treatment plant from FIG. 1, the cover element being arranged in a closing position.

An embodiment depicted in FIGS. 1 to 14 and designated therein as a whole with 100 is, for example, a painting plant for painting workpieces 102, which, for example, comprises different treatment spaces 104 for painting, drying, cooling, etc. the workpieces 102.

For the purpose of efficient energy use, arranged between different spaces 106, in particular the treatment spaces 104, are separating devices 108 of the treatment plant 100.

Such a separating device 108 is, for example, an air curtain device, and is also known under the name "airlock".

The separating device 108 serves, in particular, to minimize an air exchange between mutually adjoining spaces 106 in a transition region 110 between said spaces 106.

The separating device 108 at the same time serves as a connecting opening 112, by means of which workpieces 102 can travel from one space 106 into the other space 106.

For example, DE 10 2010 043 087 A1 discloses a treatment plant in which an air curtain is produced to minimize an air exchange between two spaces.

Additional measures for minimizing the air exchange are desirable, in particular when the workpieces 102 are vehicle bodies and as such have a large cross sectional area in the conveyance thereof.

In particular when workpieces 102 configured as vehicle bodies are conveyed in the so-called transverse manner of travel, i.e. with the respective vehicle longitudinal axis perpendicular to a conveying direction 114, through the treatment plant 100, there is an even larger cross section and thus an increased risk of an undesirably large air exchange between the spaces 106.

As can be seen in particular in FIGS. 1 to 7, the separating device 108 of the depicted treatment plant 100 therefore comprises a cover element 116, which for the purpose of reducing a cross section of the connecting opening 112 between the spaces 106 is moveable into the connecting opening 112 or is moveable out of the same.

The cover element 116 is, in particular, rotatably or pivotably mounted, for example on walls 118, in particular side walls, of the separating device 108. For this purpose, in particular, a shaft 120 extends between the walls 118. The cover element 116 is preferably fixed to said shaft 120.

Figure 3:
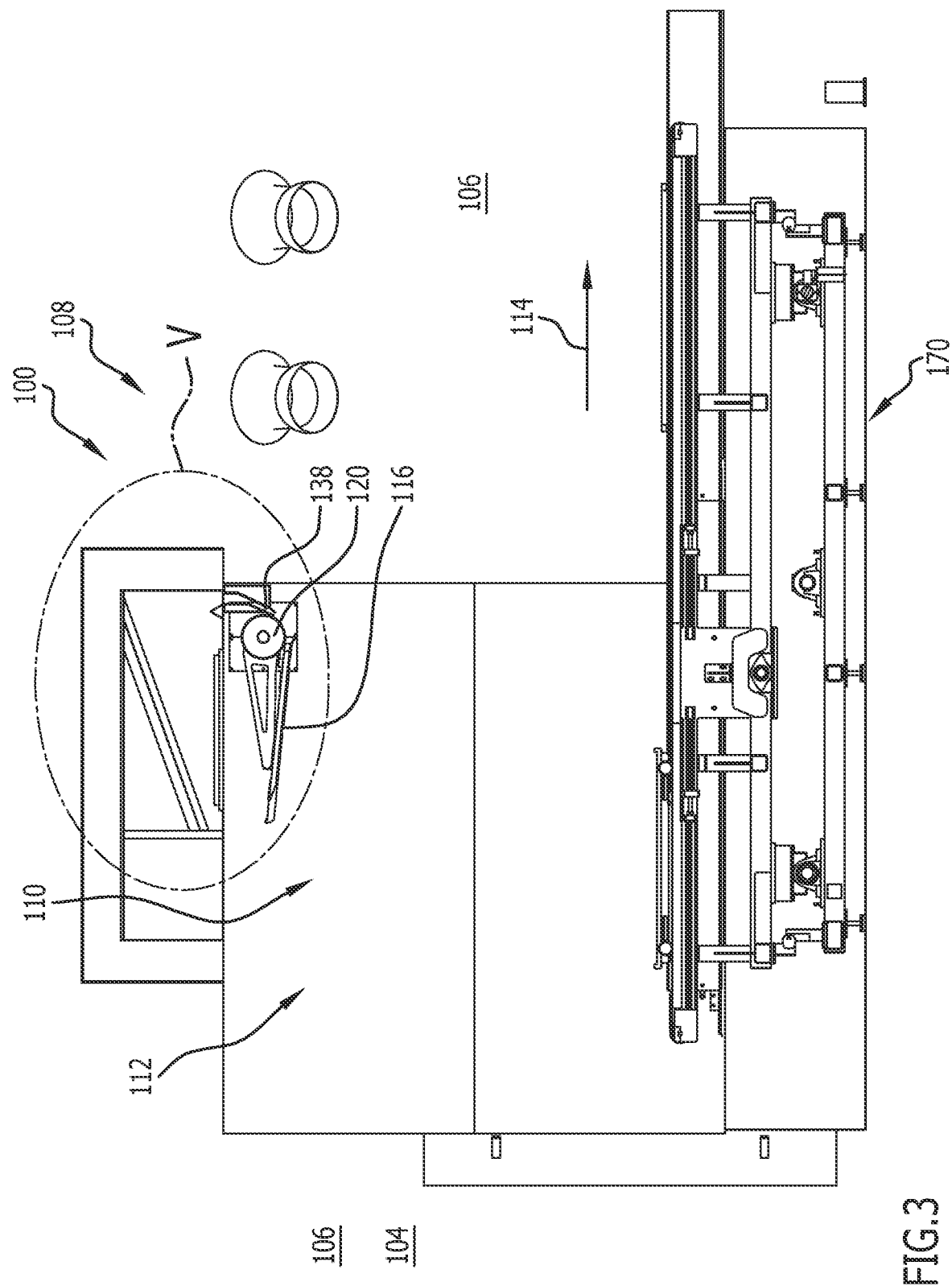
FIG. 3 shows a schematic vertical longitudinal section through the treatment plant from FIG. 1.
Figure 4:
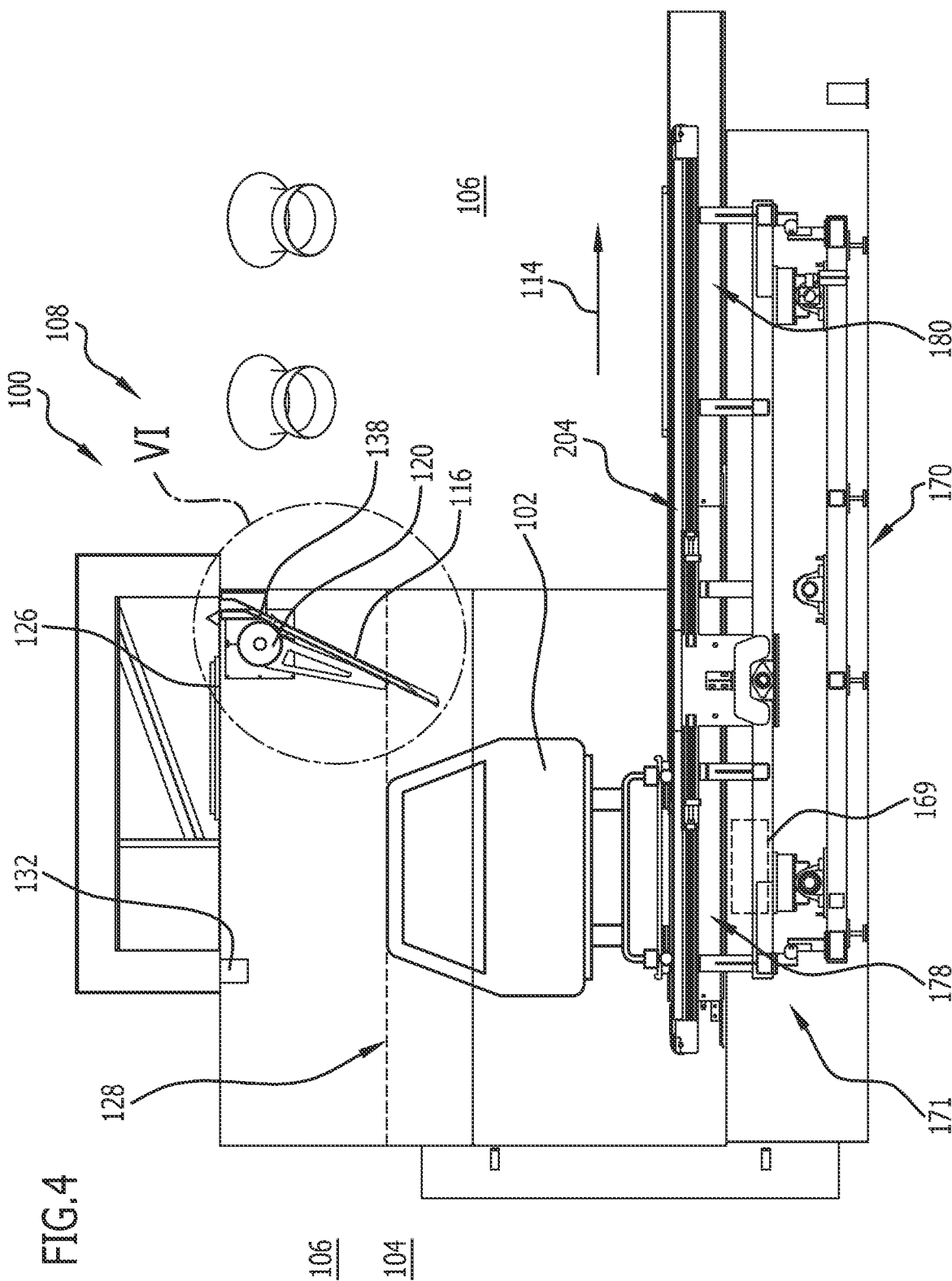
FIG. 4 shows a schematic longitudinal section, corresponding to FIG. 3, through the treatment plant according to FIG. 2, a workpiece to be treated in the treatment plant also being depicted.

The shaft 120 is coupled to a drive device 122 of the separating device 108, for example by way of a drive shaft 124, such that the cover element 116 is ultimately bringable by means of the drive device 122 in a motorized, in particular automatic manner from the open position depicted for example in FIG. 3 into the closing position depicted in FIG. 4 and vice versa from the closing position into the open position by rotation of the shaft 120.

In the closing position, the cover element 116 reduces the connecting opening 112 preferably by at least about 30%, for example at least about 40%, in comparison to the open position of the cover element 116.

The cover element 116 thereby projects, in particular, from a cover wall 126 downward into the connecting opening 112.

The larger the cover element 116 is, the more efficiently an air exchange between the two spaces 106 can be reduced by means of the cover element 116 in the closing position thereof.

However, if the cover element 116 is dimensioned accordingly, a collision thereof with the workpieces 102 may occur when the latter are conveyed through the connecting opening 112.

As can be seen in particular in FIG. 4, in the depicted embodiment of the treatment plant 100 as well, the cover element 116 extends into a movement path 128 of the workpieces 102, i.e. the cover element 116 projects into a spatial region that is passed over by the workpieces 102 upon the conveyance of the workpieces 102 through the connecting opening 112.

In order to avoid damage to the workpieces 102, the cover element 116 must thus be brought from the closing position (see FIG. 4) into the open position (see FIG. 3).

The drive device 122 is provided for this purpose.

By means of a control device 130, it is preferably also controllable that the cover element 116 is only arranged in the open position when a workpiece 102 actually has to be conveyed through the connecting opening 112. The rest of the time, the cover element 116 is preferably in the closing position in order to minimize the air exchange between the two spaces 106.

Further, a sensor device 132 may be provided in order to, alternatively or in addition to the control device 130, activate the drive device 122 and, for example, to achieve an automatic opening of the cover element 116 upon a workpiece 102 approaching the same.

Further, failure or other malfunction of the drive device 122 can preferably be prevented by means of a positioning device 134.

By means of the positioning device 134, which, in particular, comprises one or more counterweights for the cover element 116 mounted, for example, eccentrically in relation to its rotational axis 136, it can be ensured, in particular, that the cover element 116 always returns to the open position without actuating the drive device 122 or otherwise activating the drive device 122.

In addition to the cover element 116, the separating device 108 preferably further comprises a nozzle device 138.

The nozzle device 138 corresponds in its function substantially to the nozzle device from DE 10 2010 043 087 A1, to which reference is hereby made and the content of which is hereby made subject matter of the present description.

The nozzle device 138 produces, in particular, an air curtain in the transition region 110 in order to minimize an air exchange between the spaces 106.

For this purpose, the nozzle device 138 comprises, in particular, a slit-shaped outflow opening 140, which is directed e.g. from the cover wall 126 downward into the transition region 110.

Figure 5:
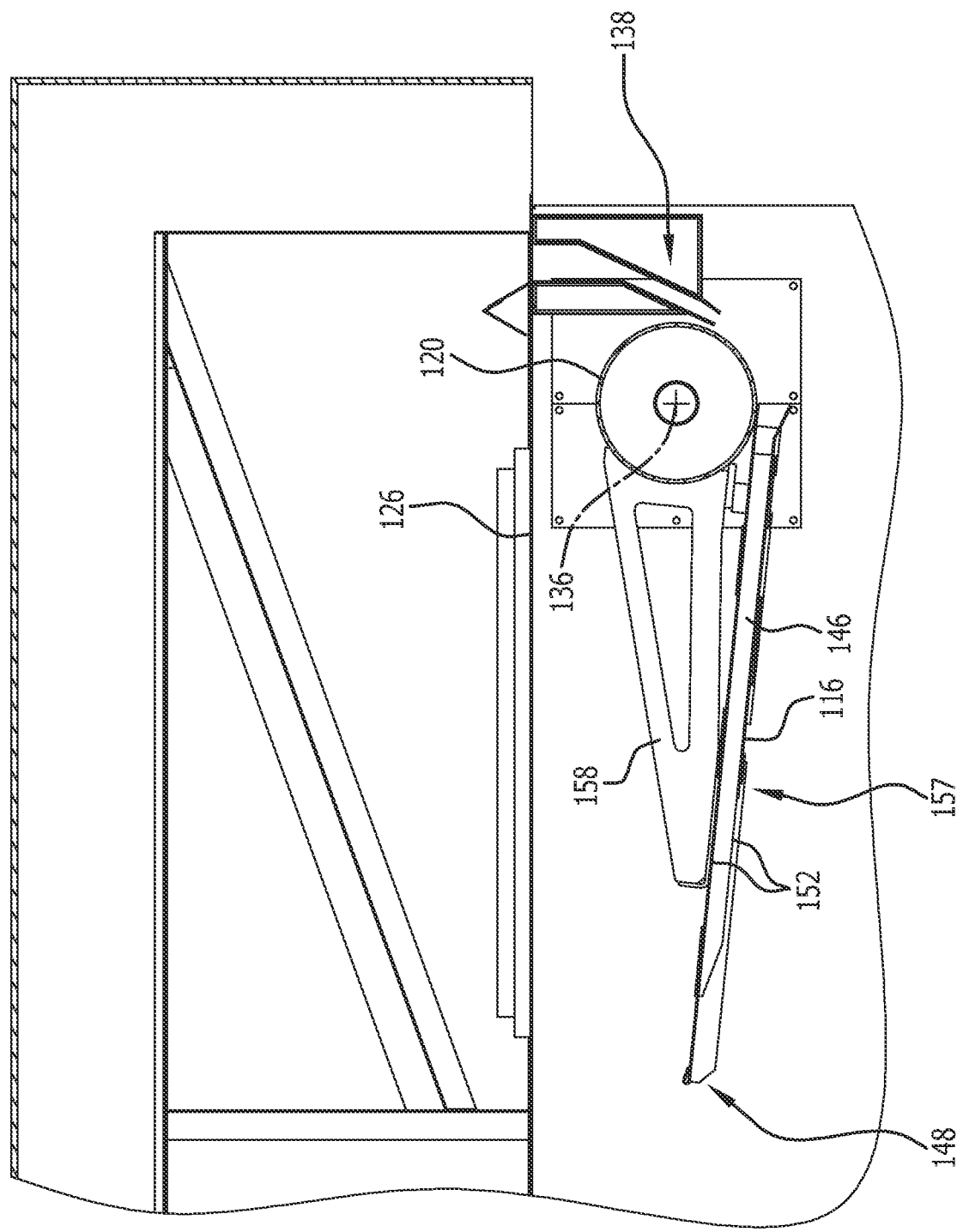
FIG. 5 shows an enlarged depiction of region V in FIG. 3.
Figure 6:
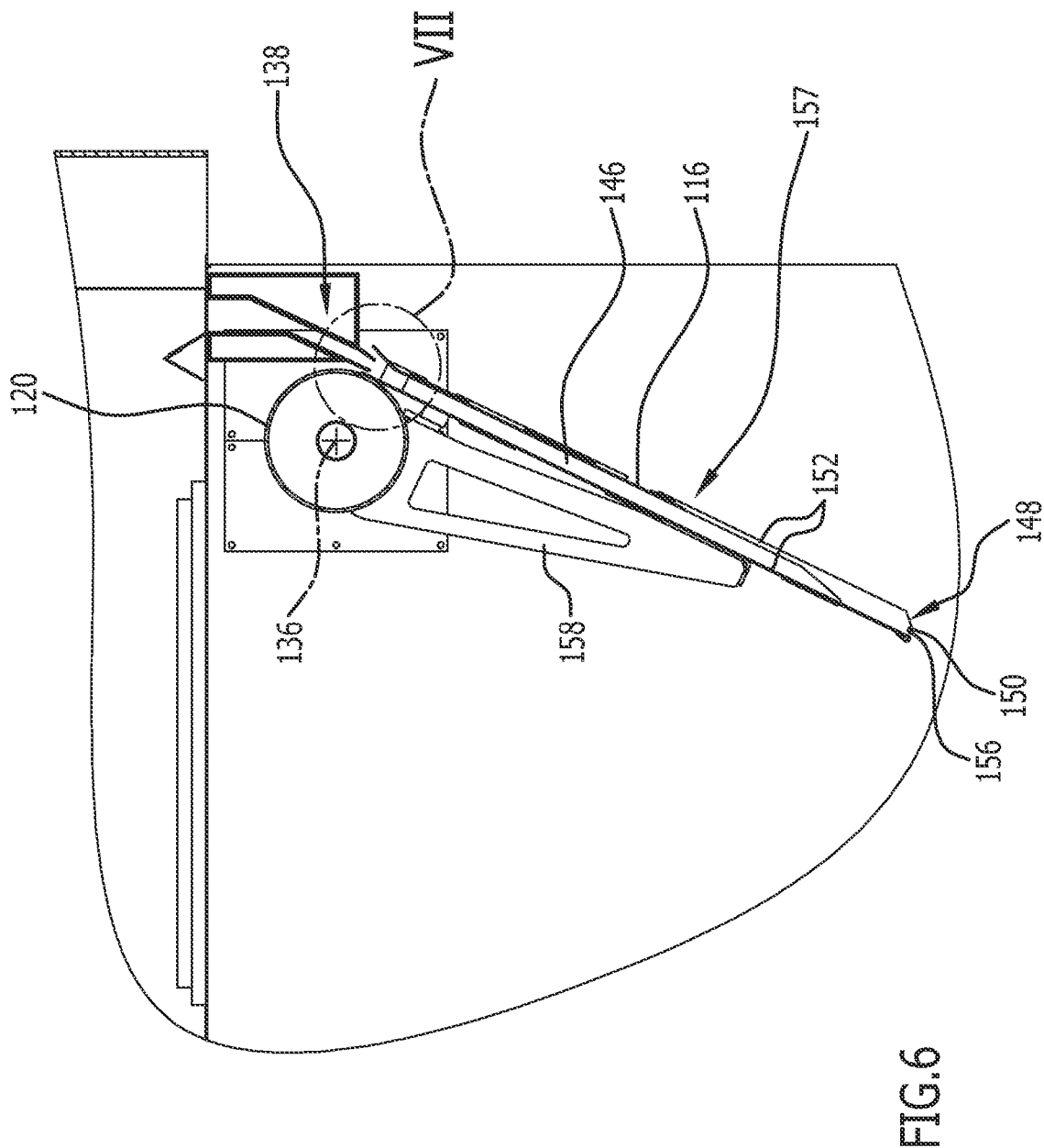
FIG. 6 shows an enlarged depiction of region VI in FIG. 4.

As can be seen in particular in FIG. 5, the nozzle device 138 in the open position of the cover element 116 ends substantially into free space, such that it results in a flow in the transition region 110 that corresponds substantially to the flow described in DE 10 2010 043 087 A1.

In particular, a separating fluid stream is thereby introducible into the transition region 110 by means of the nozzle device 138. Said separating fluid stream in particular is an air stream.

An optimized fluidic separation of the two spaces 106 from each other is preferably achieved in the embodiment of the separating device 100 depicted in FIGS. 1 to 7 by the nozzle device 128 and the cover element 116 cooperating with each other.

For this purpose, the cover element 116 is preferably arranged directly next to the nozzle device 138, in particular directly next to the outflow opening 140 of the nozzle device 138, by means of the shaft 120.

By pivoting the cover element 116, i.e. by rotating the shaft 120 together with the cover element 116 arranged thereon about the rotational axis 136, the cover element 116 can preferably be brought directly against or into the vicinity of the nozzle device 138.

To avoid undesired abrasion, a distance is preferably maintained between the cover element 116 and the nozzle device 138 in the closing position of the cover element 116 as well, said distance being, for example, at most about 10 cm, in particular at most about 5 cm, for example at most about 1 cm.

An end 142 of the cover element 116 facing the nozzle device 138 preferably has an inlet opening 144.

In the closing position of the cover element 116, the cover element 116 is preferably positioned relative to the nozzle device 138 in such a way that the outflow opening 140 is directed into the inlet opening 144, opens into the same, and/or projects into the same.

Separating fluid supplied via the nozzle device 138 thus flows into the inlet opening 144 of the cover element 116.

The cover element 116 preferably comprises a fluid guiding portion 146, which in particular is formed by a generally hollow configuration of the cover element 116.

The separating fluid stream flowing into the cover element 116 at the inlet opening 144 can thus flow through the fluid guiding portion 146 and thus travel from the end 142 facing the nozzle device 138 to an end 148 of the cover element 116 remote from the nozzle device 138.

At this end 148, which is located opposite the nozzle device 138 and thus also opposite the inlet opening 144, the separating fluid stream is able to exit the cover element 116. For this purpose, said end 148 is provided with an outlet opening 150, which is thus located opposite the inlet opening 144.

The cover element 116 in the closing position thereof is preferably a nozzle extension 157 for extending the nozzle device 138.

The cover element 116, in particular, is of substantially planar and/or plate-shaped configuration.

The fluid guiding portion 146 is thereby, in particular, a cavity between two cover plates 152 of the cover element 116. The two ends 142, 148 are configured in particular in the form of slits, such that the inlet opening 144 is configured in particular as an inlet slit 154, while the outlet opening 150 is configured in particular as an outlet slit 156.

Due to the hollow configuration of the cover element 116, and due to the dimensions being as large as possible for the purpose of high efficiency, and due to the mass being as small as possible, the cover element 116 is preferably fixed to the shaft 120 by means of one or more stiffening elements 158.

The two cover plates 152 may have at least approximately identical dimensions in one, two or all three spatial directions. Alternatively thereto, provision may be made for a first of the two cover plates 152 to be of shorter configuration compared to a second of the two cover plates 152, for example by at least about 10%, preferably by at least about 25%, in particular by at least about 40%, of a maximum and/or average extent of the second cover plate 152 along a main flow direction of the separating fluid stream within the cover element 116. Both cover plates 152 preferably end together at the end 142 of the cover element 116 facing the nozzle device 140 and extend to differing extents starting therefrom in the direction of the end 148 of the cover element 116 remote from the nozzle device 138.

If the shorter of the two cover plates 152 is arranged on an outer side of the cover element 116 remote from a treatment space 104, this preferably results in an admixing of air, in particular cold air, from outside of the treatment space 104. A flow cylinder producible by means of the separating device 108 is then in particular a cold air cylinder.

Alternatively thereto, provision may also be made for the shorter of the two cover plates 152 to be arranged on an inner side of the cover element 116 facing a treatment space 104. This then preferably results in an admixing of air, in particular warm air, from within the treatment space 104. A flow cylinder producible by means of the separating device 108 is then in particular a warm air cylinder.

The stiffening elements 158 are in particular of rib-shaped or strut-shaped configuration.

Figure 7:
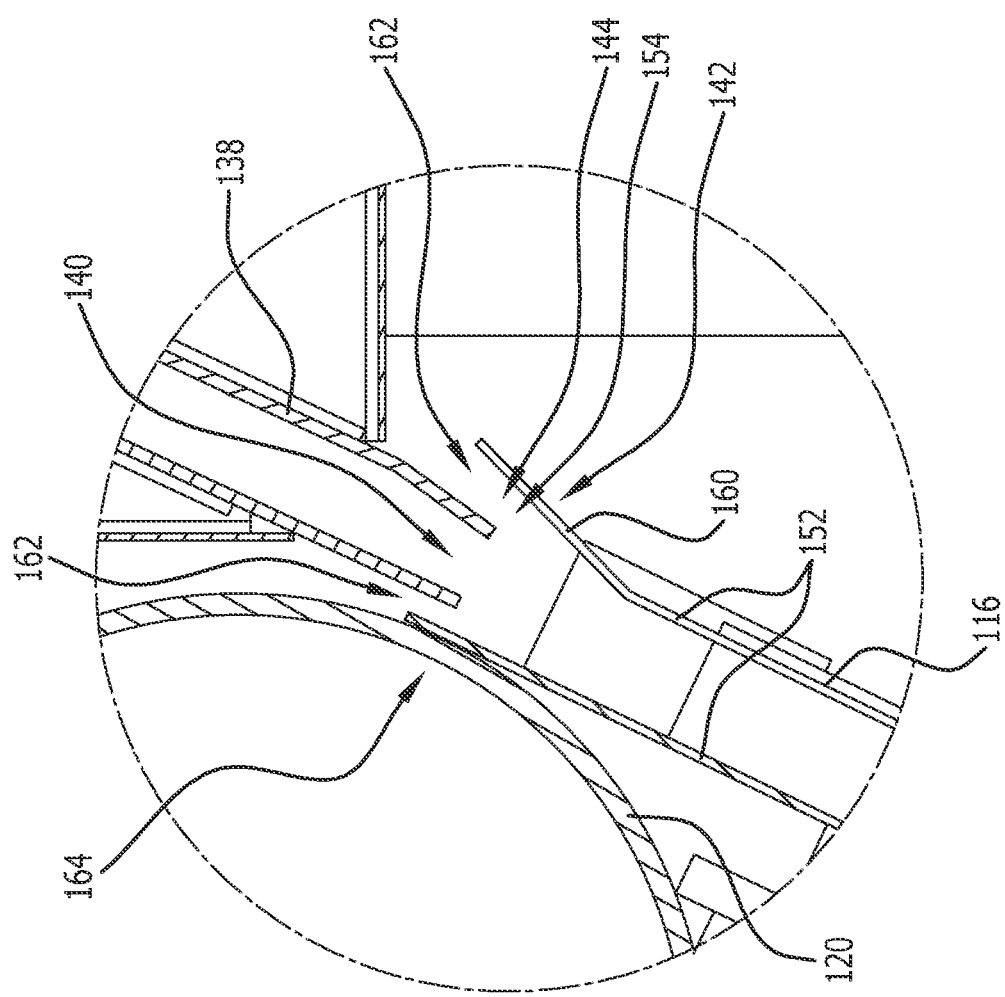
FIG. 7 shows an enlarged depiction of region VII in FIG. 6.

As can be seen in particular in FIG. 7, a specific geometry of the outflow opening 140 and the inlet opening 144 may be provided at the transition between the nozzle device 138 and the cover element 116 to optimize flow.

The outflow opening 140 is thereby preferably configured tapering toward its end, while the inlet opening 144 preferably comprises a funnel-shaped portion 160.

The nozzle device 138 preferably opens into said funnel-shaped portion 160.

The funnel-shaped portion 160 can result, for example, from a curvature, bending, folding or other deformation of one or both cover plates 152 of the cover element 116.

In the embodiment depicted in FIGS. 1 to 7, a cover plate 152 is kinked for example by about 25°, in particular only on one side.

The distance maintained between the nozzle device 138 and the cover element 116 results in two additional slits 162, by means of which separating fluid flowing out of the nozzle device 138 is able to flow outward while bypassing the cover element 116 or by means of which fluid is able to travel from the surroundings of the nozzle device 138 and/or the cover element 116, in particular air from the spaces 106, into the cover element 116.

The latter occurs in particular when the outflow opening 140 of the nozzle device 138 together with the inlet opening 144 of the cover element 116 form a suction jet nozzle 164, as a result of which an underpressure can form in the region of the additional slits 162, said underpressure then leading to the aspiration of fluid, in particular air, from the surrounding area.

In particular, a targeted annular flow, preferably a flow cylinder, can be produced in the transition region 110 by way of the additional slits 162, the use of the cover element 116 in the closing position thereof resulting in a smaller height of the transition region 110 having to be bridged compared to conventional air curtains, and thus a smaller amount of separating fluid, in particular a smaller volume flow, suffices for the operation of the separating device 108, or a more efficient fluidic separation of the spaces 106 can be achieved.

It may be advantageous in particular for the formation of an optimized flow cylinder if the separating device 108 comprises one or more suction openings 169, by means of which a separating fluid stream and/or another fluid stream is suctionable, in particular from a transition region 110 between the two spaces 106 and/or from one of the spaces 106 and/or from both spaces 106 (see FIG. 4).

One or more suction openings 169 are arranged, in particular, in a base region 171 of the separating device 108, in particular integrated into a base.

The one or more suction openings 169 are positioned and/or formed in particular in such a way that a separating fluid stream exiting the cover element 116 in the closing position of the cover element 116 is directed at the one or more suction openings 169.

As mentioned above, the cover element 116 must be arranged in the closing position for as long as possible for an optimized fluidic separation of the two spaces 106.

When a workpiece 102 is conveyed through the connecting opening 112, the period of time in which the cover element 116 is arranged in the open position depends on the conveying speed.

The treatment plant 100 therefore preferably comprises an optimized conveying system 170, by means of which an accelerated passage of the workpiece 102 through the connecting opening 112 is possible.

Figure 8:
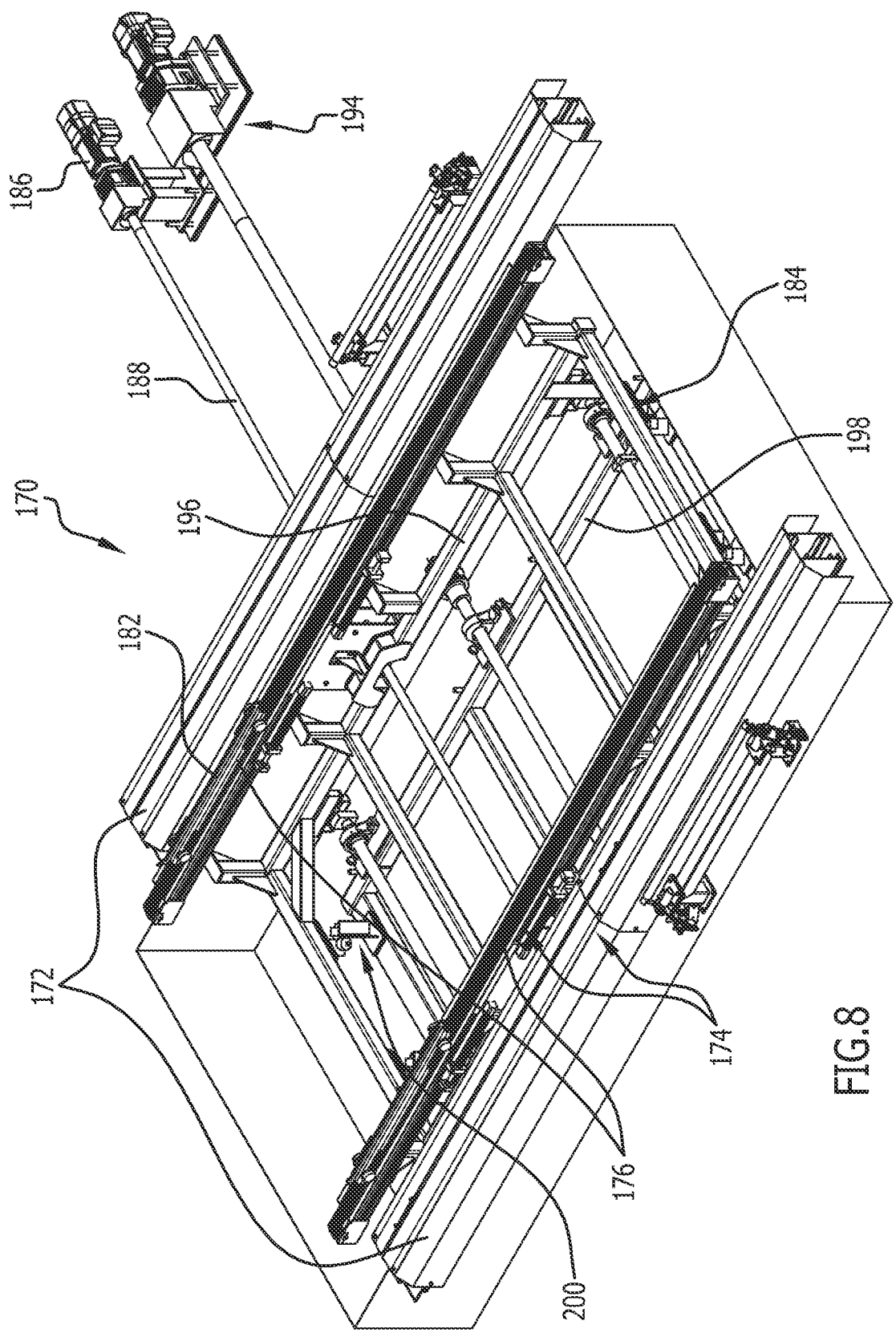
FIG. 8 shows a schematic perspective depiction of the conveying system from FIG. 1.
Figure 9:
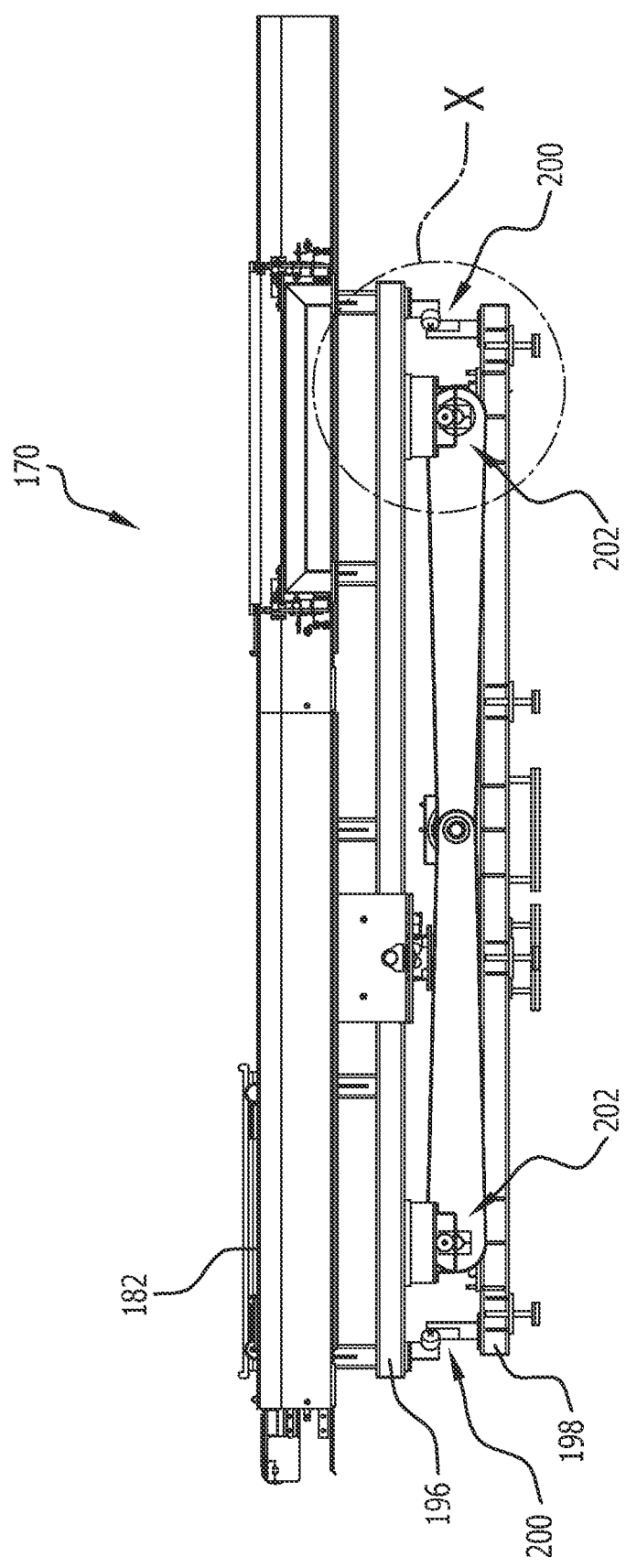
FIG. 9 shows a schematic side view of the conveying system from FIG. 8.
Figure 10:
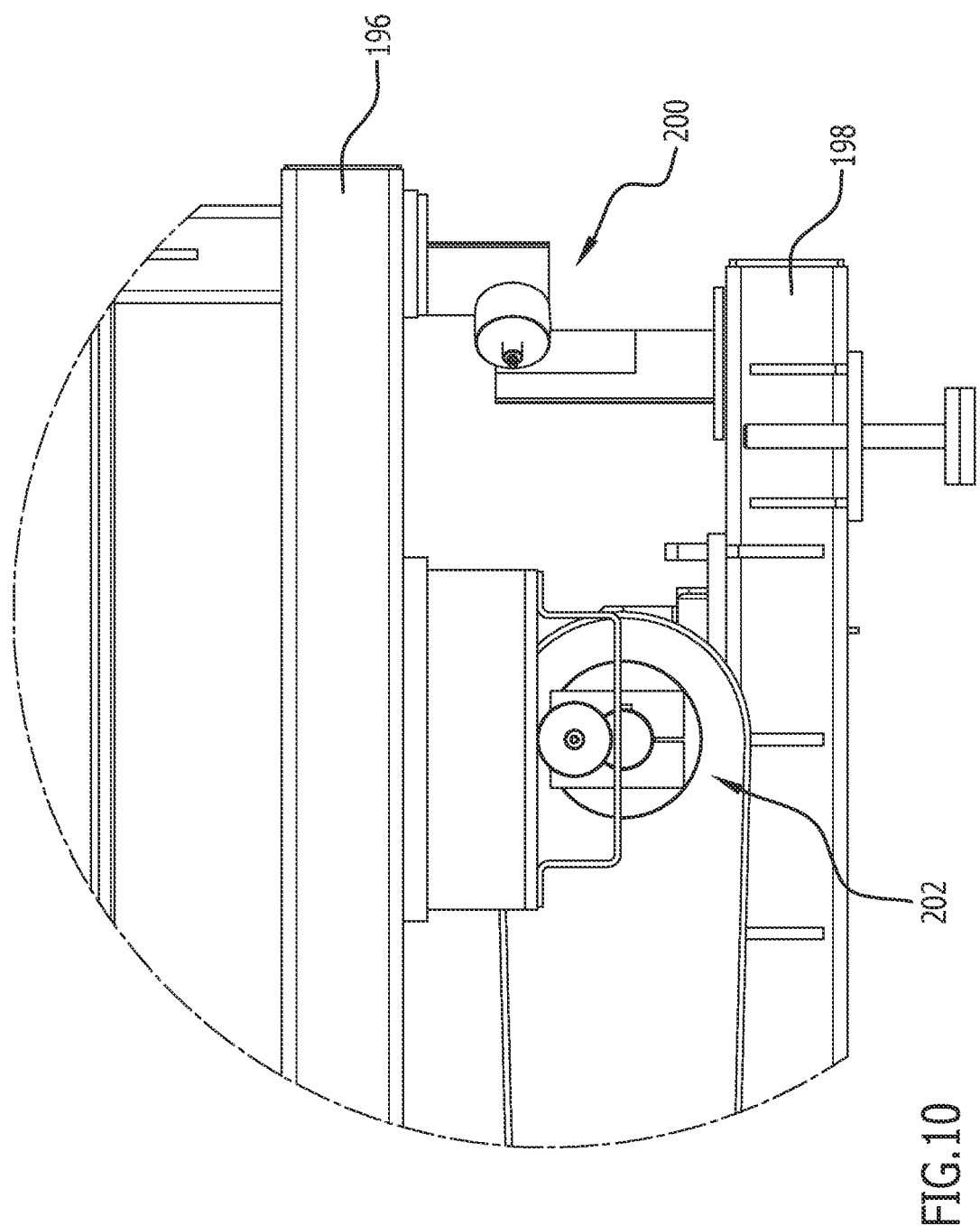
FIG. 10 shows an enlarged depiction of region X in FIG. 9.
Figure 11:
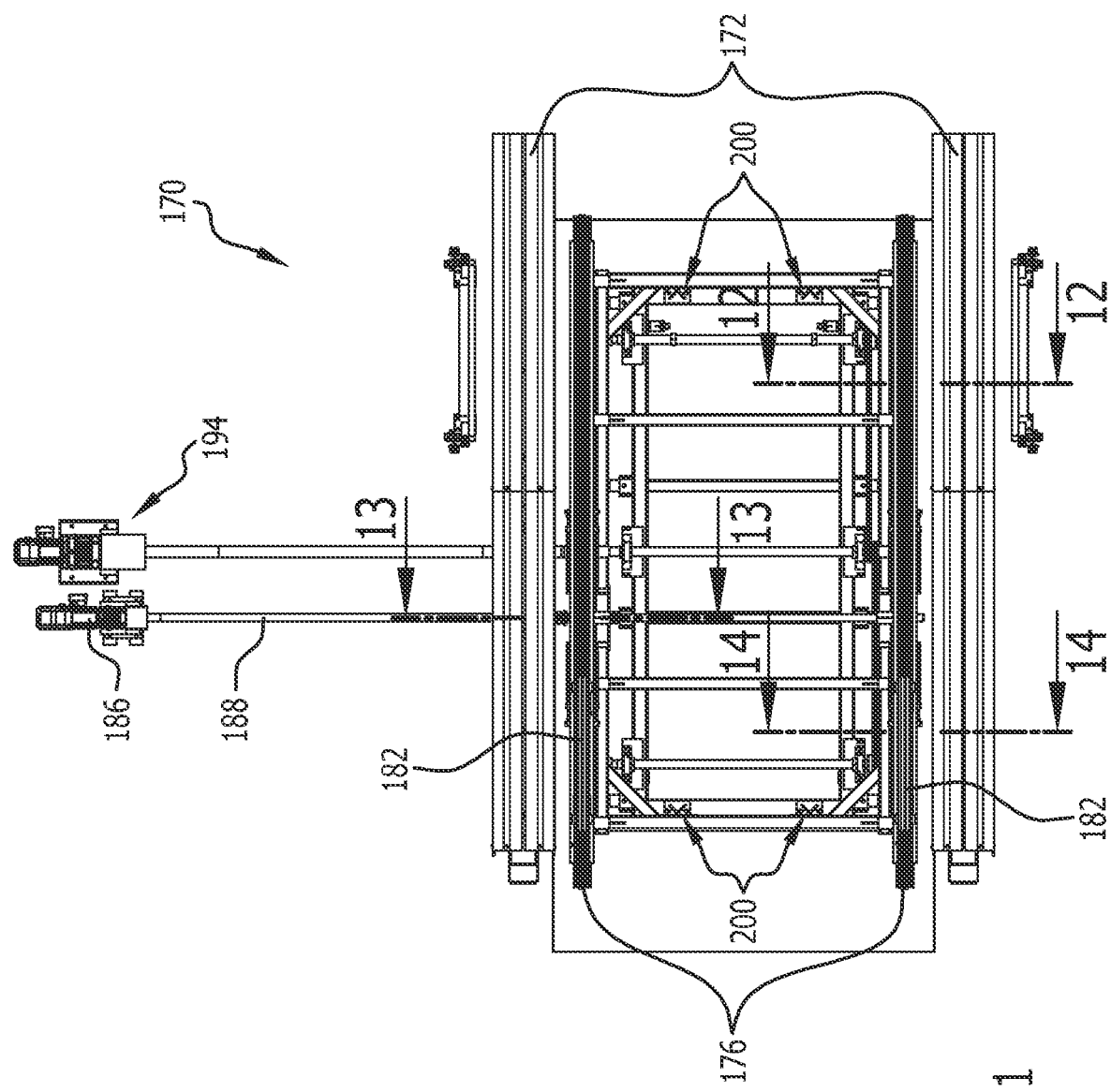
FIG. 11 shows a schematic plan view of the conveying system from FIG. 8.

As can be seen in particular in FIG. 8, the conveying system 170 comprises a first conveying device 172, which is configured e.g. as a chain conveyor 174 and serves to continuously convey or convey in a step-wise manner workpieces 102, for example mounted on skids.

The first conveying device 172 serves in particular to convey the workpieces 102 relatively slowly through one or more treatment spaces 104 of the treatment plant 100 in order to ultimately achieve a treatment duration of the workpieces 102 that is as long as possible on a short conveying path.

If the first conveying device 172 is now used to convey the workpieces 102 through the connecting opening 112 of the separating device 108, this may result in undesirably long opening times of the cover element 116.

The conveying system 170 therefore preferably comprises a second conveying device 176, which, in particular, enables a quicker conveyance of the workpieces 102 in comparison to the first conveying device 172.

The second conveying device 176 thereby preferably extends along the first conveying device 172. In particular, both conveying devices 172, 176 have a common conveying direction 114 and/or a common conveying path.

The second conveying device 176 serves in particular to lift the workpieces 102 individually, one after the other, from the first conveying device 172, and to convey them along the conveying direction 114 in a temporarily accelerated manner.

The second conveying device 176 comprises, in particular, a receiving station 178 at which the workpieces 102 are taken over from the first conveying device 172.

Further, the second conveying device 176 comprises a hand-off station 180 at which the workpieces 102, in particular, are transferred back to the first conveying device 172.

The second conveying device 176 is preferably also a chain conveyor 174.

Both the first conveying device 172 and the second conveying device 176 each comprise one or more conveying elements 182, by means of which the conveying devices 172, 176 engage, in particular, directly on a workpiece 102 to be conveyed or on a workpiece receptacle, for example a skid.

Figure 12:
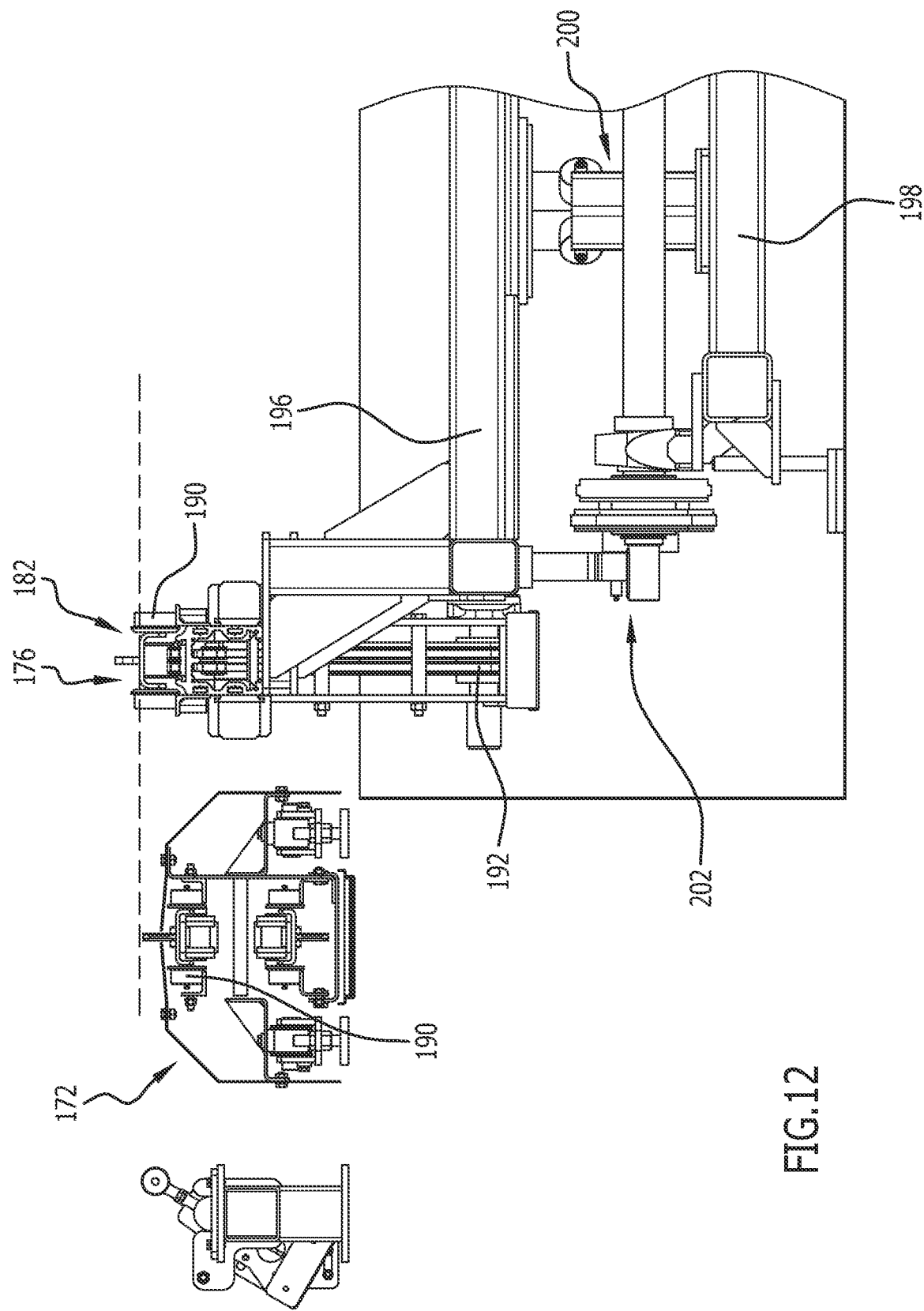
FIG. 12 shows a schematic vertical section through the conveying system from FIG. 8 along line 12-12 in FIG. 11.
Figure 13:
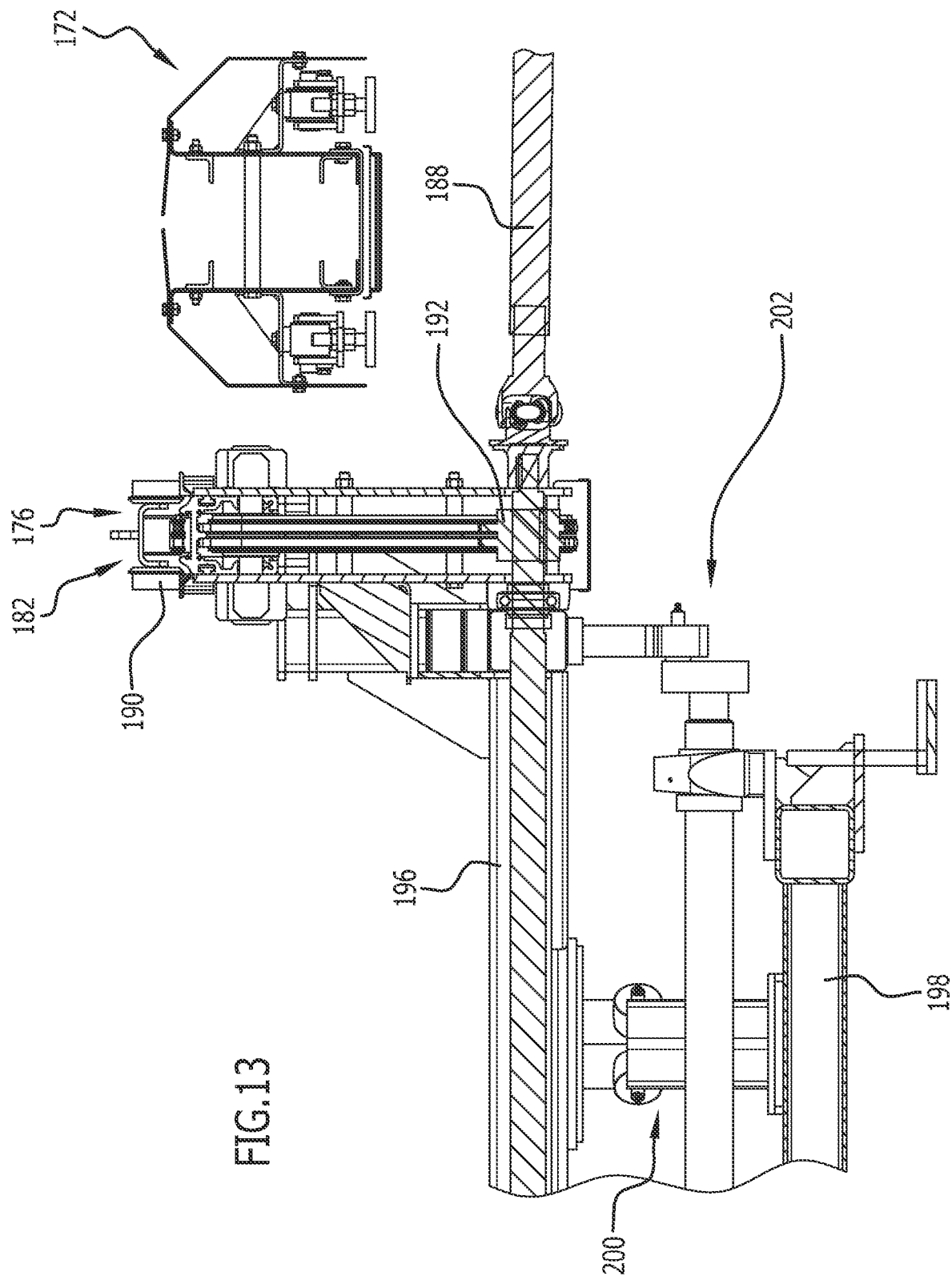
FIG. 13 shows a schematic vertical section through the conveying system from FIG. 8 along line 13-13 in FIG. 11.
Figure 14:
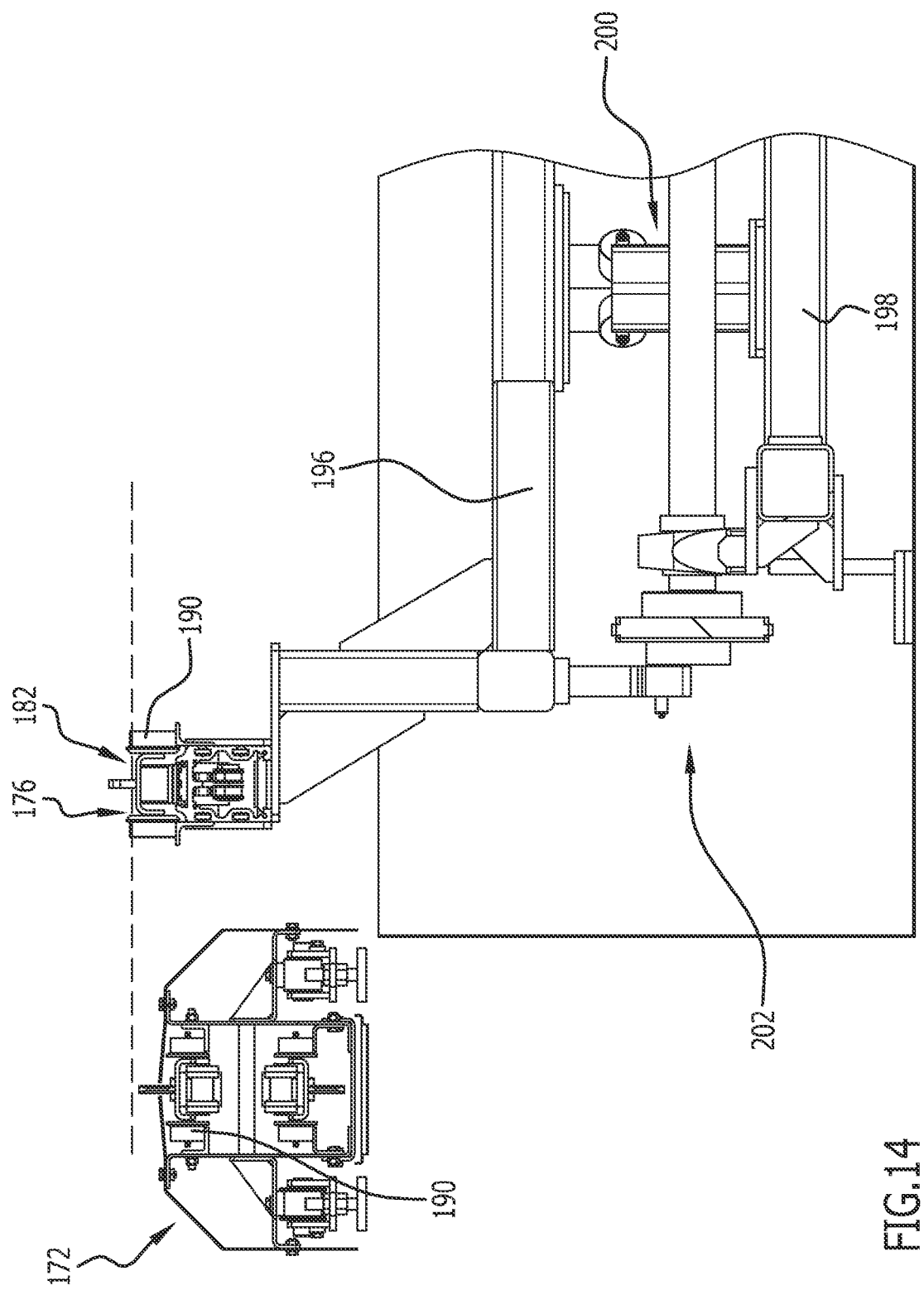
FIG. 14 shows a schematic vertical section through the conveying system from FIG. 8 along line 14-14 in FIG. 11.

In the case of the embodiment of the conveying system 170 depicted in FIGS. 8 to 14, the question as to whether the conveying elements 182 of the first conveying device 172 or the conveying elements 182 of the second conveying device 176 engage on the workpieces 102 depends on to what height the conveying elements 182 of the second conveying device 176 are brought relative to the conveying elements 182 of the first conveying device 172 (see in particular FIG. 12).

For this purpose, the second conveying device 176 comprises a lifting device 184, by means of which the conveying elements 182 of the second conveying device 176 are adjustable in the vertical directions, i.e. are height-adjustable.

Together with the conveying elements 182, the further typical components, which are therefore presently not further specified, of the second conveying device 176 configured as a chain conveyor 174 are preferably also adjusted in their respective height.

The conveying elements 182 are, in particular, carriages 190 of the chain conveyor 174.

For driving the conveying elements 182 of the second conveying device 176, a chain drive device 186, for example an electric motor, is preferably provided. Said chain drive device 186 is, in particular, coupled to a drive chain 192 of the second conveying device 176 by means of a cardan shaft 188 in order to be able to compensate for a varying height of the drive chain 192 by actuating the lifting device 184.

The lifting device 184 preferably comprises a lifting drive 194.

By means of the lifting drive 194, in particular a support frame 196 of the lifting device 184 can be moved with regard to its height relative to a base construction 198 of the second conveying device 176.

One or more guide elements 200, for example guide rollers, preferably limit the possibility of movement of the support frame 196 relative to the base construction 198 to a movement exclusively in the vertical direction.

The support frame 196 is preferably coupled to the base construction 198 by means of eccentric elements 202.

Said eccentric elements 202 are thereby preferably bringable into different rotational orientations by means of the lifting drive 194 in order to ultimately arrange the support frame 196 and thus the conveying elements 182 of the second conveying device 176 in different height positions.

By means of the lifting drive 194, the conveying elements 182 of the second conveying device 176 can thus, in particular, be brought into engagement with the workpiece 102 or an associated workpiece receptacle, for example a skid, at the receiving station 178 in order to lift the workpiece 102 from the first conveying device 172.

By driving the drive chain 192 and thus the conveying elements 182 fixed thereto by means of the chain drive device 186, the respectively received workpiece 102 can then be conveyed along the conveying direction 114 to the hand-off station 180.

The period of time for conveying the workpiece 102 from the receiving station 178 to the hand-off station 180 is thereby preferably at most about 50%, preferably at most about 20%, for example at most about 10%, of the period of time that would pass for the conveyance of the workpiece 102 over the same conveying path by means of the first conveying device 172.

The second conveying device 176 thus is or comprises, in particular, an accelerating device 204, by means of which the workpieces 102 are conveyable in an accelerated manner in comparison to the first conveying device 172.

By means of the second conveying device 176, one or more holding positions of the workpieces 102 along the conveying path of the first conveying device 172 can thereby be skipped, in particular in a step-wise conveyance of the workpieces 102. Particularly if there were one or more holding positions in the transition region 110 due to the configuration of the first conveying device 172, an undesirably long stay of the workpieces 102 in the transition region 110 can be avoided by using the second conveying device 176.

The invention claimed is:

1. Conveying system for conveying objects, in particular vehicle bodies, wherein the conveying system comprises:
   a first conveying device for conveying the objects at a first speed;
   a second conveying device by which the objects are conveyable at a second speed along a longitudinal direction and through a cross-sectional area, the cross-sectional area defining a transition region between a treatment space and a further space, wherein the second speed is higher than the first speed, and wherein the objects are transferrable between the first conveying device and the second conveying device; and
   a cover movable relative to the cross-sectional area to vary an amount of the cross-sectional area.

2. Conveying system in accordance with claim 1, wherein the second conveying device includes a lifting device, by which the objects are liftable from the first conveying device and receivable by the second conveying device.

3. Conveying system in accordance with claim 1, wherein the second conveying device includes a lifting device, by which the objects are lowerable onto the first conveying device or onto a third conveying device and transferrable to the first conveying device or the third conveying device.

4. Conveying system in accordance with claim 2, wherein at least one of:
   a) by the lifting device, conveying elements of the second conveying device are raisable and bringable into engagement with the objects in a positive-locking manner; or
   b) by the lifting device, conveying elements of the second conveying device are lowerable and bringable out of engagement with the objects.

5. Conveying system in accordance with claim 1, wherein the second conveying device extends only along a portion of a conveying path of the first conveying device.

6. Conveying system in accordance with claim 1, wherein the first conveying device is a step-wise conveyor, by which the objects are conveyable within a predetermined step cycle time from a holding position to a subsequent further holding position along a conveying path, wherein upon reaching a predetermined holding position within a step cycle of the first conveying device and/or during a dwell time of the objects at the respective holding position, the objects are receivable from the predetermined holding position and bringable to another holding position by the second conveying device.

7. Conveying system in accordance with claim 1, wherein at least one of the first conveying device or the second conveying device is a chain conveyor.

8. Conveying system in accordance with claim 1, wherein at least one of the first conveying device or the second conveying device is a chain conveyor with two separate chains, wherein the chains are synchronized with each other, and wherein one of the chains serves to convey the objects up to the second conveying device and wherein a further one of the chains serves to convey the objects away from the second conveying device.

9. Treatment plant for treating workpieces, comprising a conveying system in accordance with claim 1, wherein workpieces are conveyable through the treatment space of the treatment plant by the first conveying device and wherein the workpieces are conveyable through the transition region between the treatment space and a further space by the second conveying device.

10. Treatment plant in accordance with claim 9, wherein the transition region is a lock region for reducing an air exchange between the treatment space and the further space, and wherein the transition region extends along a conveying path of the conveying system at least so far that the transition region includes at least one holding position of the first conveying device or includes at least one such holding position if a series of holding positions of the first conveying device were extended into the transition region.

11. Treatment plant in accordance with claim 9, wherein the second conveying device includes a receiving station for receiving the workpieces and a hand-off station for handing off the workpieces,
   wherein the receiving station is arranged:
   a) in the treatment space; or
   b) in the transition region; or
   c) in the further space;
   and/or wherein the hand-off station is arranged:
   a) in the further space; or
   b) in the treatment space.

12. Treatment plant in accordance with claim 9, wherein the cover is introducible into a movement path of the workpieces in the transition region for temporarily reducing a connecting opening between the treatment space and the further space, and wherein by a control device of the treatment plant, the cover and the second conveying device are controllable in such a way that the cover is moved out of the movement path when a workpiece is introduced into the transition region and/or conveyed through the transition region and/or moved out of the transition region by the second conveying device.

13. Method for conveying objects, comprising:
   conveying the objects by a first conveying device at a first speed;
   conveying the objects by a second conveying device at a second speed along a longitudinal direction and through a cross-sectional area, the cross-sectional area defining a transition region between a treatment space and a further space, wherein the second speed is higher than the first speed, and wherein the objects are transferable between the first conveying device and the second conveying device; and
   moving a cover relative to the cross-sectional area to vary an amount of the cross-sectional area.

14. Method in accordance with claim 13, wherein one or more holding positions, in which the objects temporarily dwell upon being conveyed by the first conveying device, are skipped by the second conveying device.

15. Method in accordance with claim 13, wherein the objects are introduced into the transition region, conveyed through the transition region and/or moved out of the transition region by the second conveying device, and wherein the cover arranged in the transition region is opened and unblocks a movement path of the objects.

16. Conveying system for conveying objects, in particular vehicle bodies, wherein the conveying system comprises:
   a first conveying device for conveying the objects at a first step cycle time;
   a second conveying device by which the objects are conveyable at a second step cycle time along a longitudinal direction and through a cross-sectional area, the cross-sectional area defining a transition region between a treatment space and a further space, wherein the second step cycle time is shorter than the first step cycle time, and wherein the objects are transferrable between the first conveying device and the second conveying device; and
   a cover movable relative to the cross-sectional area to vary an amount of the cross-sectional area.

17. Conveying system in accordance with claim 16, wherein the second conveying device includes a lifting device, by which the objects are liftable from the first conveying device and receivable by the second conveying device.

18. Conveying system in accordance with claim 16, wherein the second conveying device includes a lifting device, by which the objects are lowerable onto the first conveying device or onto a third conveying device and transferrable to the first conveying device or the third conveying device.

19. Conveying system in accordance with claim 17, wherein at least one of:
   a) by the lifting device, conveying elements of the second conveying device are raisable and bringable into engagement with the objects in a positive-locking manner; or
   b) by the lifting device, conveying elements of the second conveying device are lowerable and bringable out of engagement with the objects.

20. Conveying system in accordance with claim 16, wherein the second conveying device extends only along a portion of a conveying path of the first conveying device.

21. Conveying system in accordance with claim 16, wherein the first conveying device is a step-wise conveyor, by which the objects are conveyable within a predetermined step cycle time from a holding position to a subsequent further holding position along a conveying path, wherein upon reaching a predetermined holding position within a step cycle of the first conveying device and/or during a dwell time of the objects at the respective holding position, the objects are receivable from the predetermined holding position and bringable to another holding position by the second conveying device.

22. Conveying system in accordance with claim 16, wherein at least one of the first conveying device or the second conveying device is a chain conveyor.

23. Conveying system in accordance with claim 16, wherein at least one of the first conveying device or the second conveying device is a chain conveyor with two separate chains, wherein the chains are synchronized with each other, and wherein one of the chains serves to convey the objects up to the second conveying device and wherein a further one of the chains serves to convey the objects away from the second conveying device.

24. Treatment plant for treating workpieces, comprising a conveying system in accordance with claim 16, wherein workpieces are conveyable through the treatment space of the treatment plant by the first conveying device and wherein the workpieces are conveyable through the transition region between the treatment space and the further space by the second conveying device.

25. Treatment plant in accordance with claim 24, wherein the transition region is a lock region for reducing an air exchange between the treatment space and the further space, and wherein the transition region extends along a conveying path of the conveying system at least so far that the transition region comprises at least one holding position of the first conveying device or at least would comprise at least one such holding position if a series of holding positions of the first conveying device were extended into the transition region.

26. Treatment plant in accordance with claim 25, wherein the second conveying device includes a receiving station for receiving the workpieces and a hand-off station for handing off the workpieces,
wherein the receiving station is arranged:
a) in the treatment space; or
b) in the transition region; or
c) in the further space;
and/or wherein the hand-off station is arranged:
a) in the further space; or
b) in the treatment space.

27. Treatment plant in accordance with claim 25, wherein the cover is introducible into a movement path of the workpieces in the transition region for temporarily reducing a connecting opening between the treatment space and the further space, and
wherein by a control device of the treatment plant, the cover and the second conveying device are controllable in such a way that the cover is moved out of the movement path when a workpiece is introduced into the transition region and/or conveyed through the transition region and/or moved out of the transition region by the second conveying device.

28. Method for conveying objects, comprising:
conveying the objects by a first conveying device at a first step cycle time;
conveying the objects by a second conveying device at a second step cycle time along a longitudinal direction and through a cross-sectional area, the cross-sectional area defining a transition region between a treatment space and a further space, wherein the second step cycle time is shorter than the first step cycle time, and wherein the objects are transferrable between the first conveying device and the second conveying device; and
moving a cover relative to the cross-sectional area to vary an amount of the cross-sectional area.

29. Method in accordance with claim 28, wherein one or more holding positions, in which the objects temporarily dwell upon being conveyed by the first conveying device, are skipped by the second conveying device.

30. Method in accordance with claim 28, wherein the objects are introduced into the transition region, conveyed through the transition region and/or moved out of the transition region by the second conveying device, and wherein the cover is arranged in the transition region is opened and unblocks a movement path of the objects.

* * * * *